US010988361B2

(12) United States Patent
Luminet et al.

(10) Patent No.: US 10,988,361 B2
(45) Date of Patent: Apr. 27, 2021

(54) VISUAL ASSISTANCE TO THE ON-GROUND MOVEMENT OF A LIFTING PLATFORM

(71) Applicant: HAULOTTE GROUP, L'Horme (FR)

(72) Inventors: Philippe Luminet, Lyons (FR);
Sebastian Dittus, Mornant (FR);
Clément Viaouët, Lyons (FR)

(73) Assignee: HAULOTTE GROUP, L'Horme (FR)

( * ) Notice: Subject to any disclaimer, the term of this patent is extended or adjusted under 35 U.S.C. 154(b) by 48 days.

(21) Appl. No.: 16/333,104

(22) PCT Filed: Jul. 4, 2017

(86) PCT No.: PCT/FR2017/051818
§ 371 (c)(1),
(2) Date: Mar. 13, 2019

(87) PCT Pub. No.: WO2018/055246
PCT Pub. Date: Mar. 29, 2018

(65) Prior Publication Data
US 2019/0225471 A1 Jul. 25, 2019

(30) Foreign Application Priority Data
Sep. 21, 2016 (FR) ...................................... 1658887

(51) Int. Cl.
*B66F 11/04* (2006.01)
*B60Q 1/50* (2006.01)
(Continued)

(52) U.S. Cl.
CPC .............. *B66F 11/046* (2013.01); *B60Q 1/50* (2013.01); *B60Q 9/00* (2013.01); *B66F 11/042* (2013.01); *B60Q 1/34* (2013.01)

(58) Field of Classification Search
CPC .. B60Q 11/50; B60Q 9/00; B60Q 1/34; B66F 11/046; B66F 11/042
See application file for complete search history.

(56) References Cited

U.S. PATENT DOCUMENTS 4,457,403 A * 7/1984 Ream .................... B66F 11/042
182/141
7,194,358 B2 3/2007 Callaghan et al.
(Continued)

FOREIGN PATENT DOCUMENTS

DE 102006002960 7/2007
EP 2045575 A2 4/2009
(Continued)

Primary Examiner — Alvin C Chin-Shue
(74) Attorney, Agent, or Firm — 24IP Law Group USA, PLLC; Timothy DeWitt

(57) ABSTRACT

The aerial work platform comprises a control console (30) for moving the platform (20) to a working position at a height and for moving the chassis (2) on the ground in the forward ($F_{AV}$) and backward ($F_{AV}$) directions. To avoid confusing these two directions of movement because of the variable orientation of the console (30) with respect to the chassis (2), the direction of movement selected at the control console (30) is indicated to the operator by activation of at least one visual indication (63*a*, 64*a*, 64*b*, 70.*i*, 72)
  located on the side of the chassis (2) that corresponds to the direction of movement selected, or
  having a form pointing in the direction of movement ($F_{AV}$, $F_{AR}$) selected.
A screen (40) also indicates the direction of movement ($F_{AV}$, $F_{AR}$) selected by a display transposing to the screen (40) the above visual indication system in relation to the azimuthal direction of the chassis (2) with respect to the console (30).

18 Claims, 14 Drawing Sheets

(51) Int. Cl.
*B60Q 9/00* (2006.01)
*B60Q 1/34* (2006.01)

(56) References Cited

U.S. PATENT DOCUMENTS

| | | | |
|---|---|---|---|
| 9,079,756 B2* | 7/2015 | Beji | B66F 17/006 |
| 2014/0054254 A1* | 2/2014 | Ogawa | B66C 13/40 |
| | | | 212/276 |
| 2015/0259185 A1* | 9/2015 | Ditty | B66F 9/07559 |
| | | | 182/19 |
| 2017/0001846 A1* | 1/2017 | Paavolainen | B66F 9/24 |

FOREIGN PATENT DOCUMENTS

| | | |
|---|---|---|
| FR | 2909084 A1 | 5/2008 |
| JP | 2007198040 A | 8/2007 |
| KR | 20160129135 | 11/2016 |
| WO | 2011109897 | 9/2011 |

\* cited by examiner

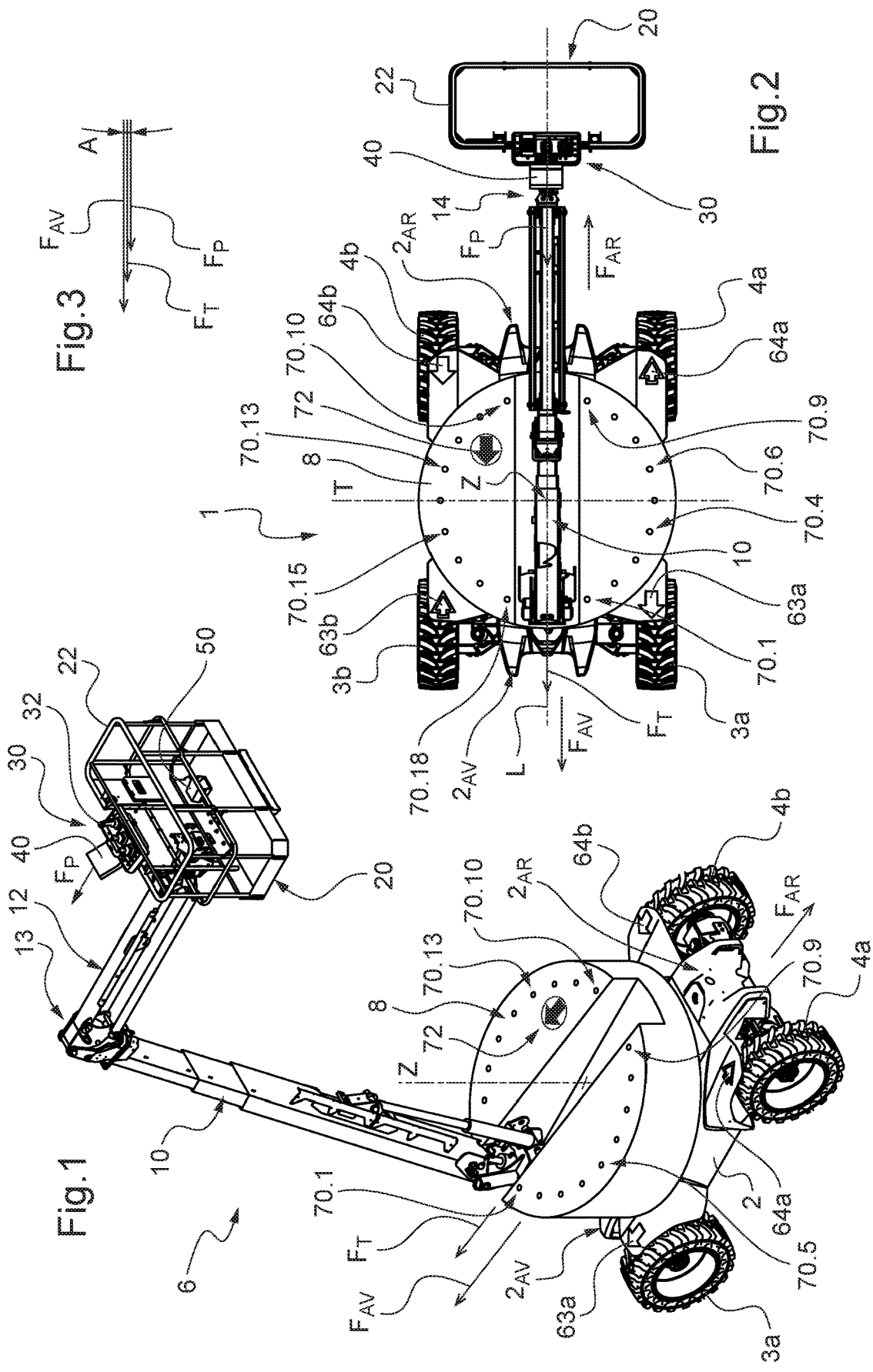

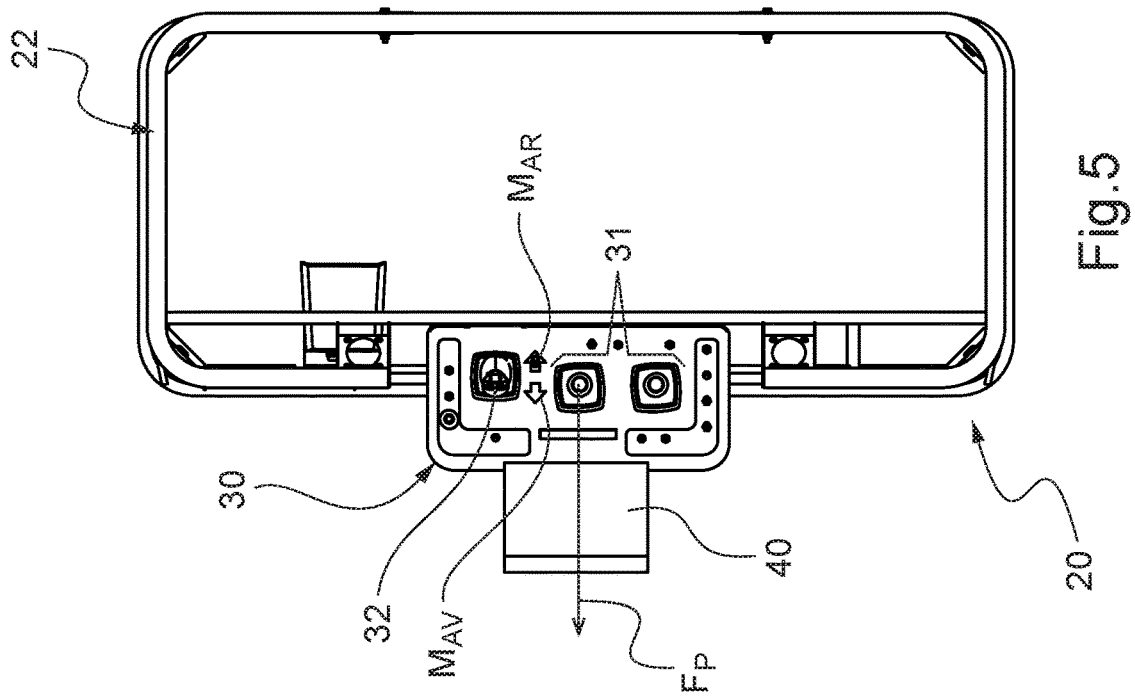
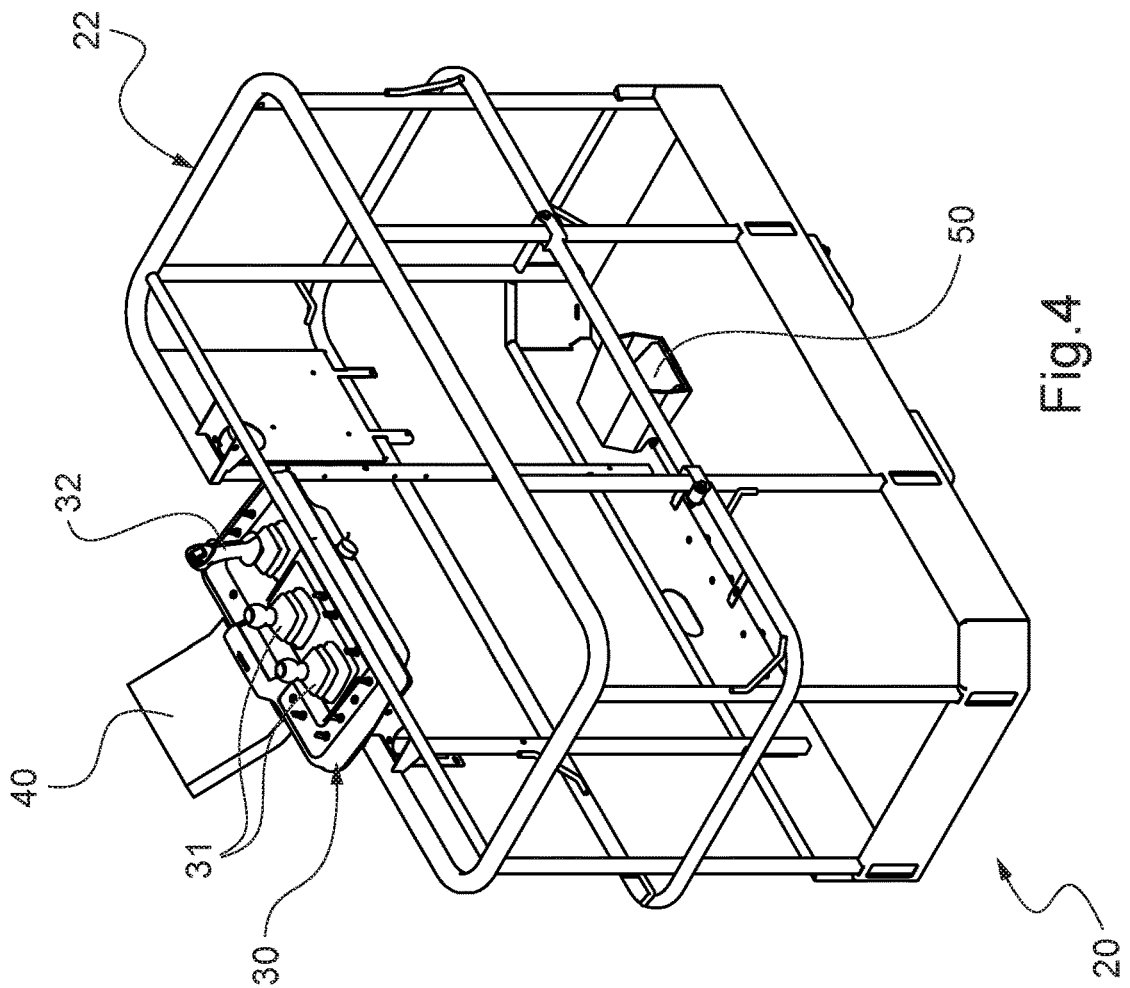

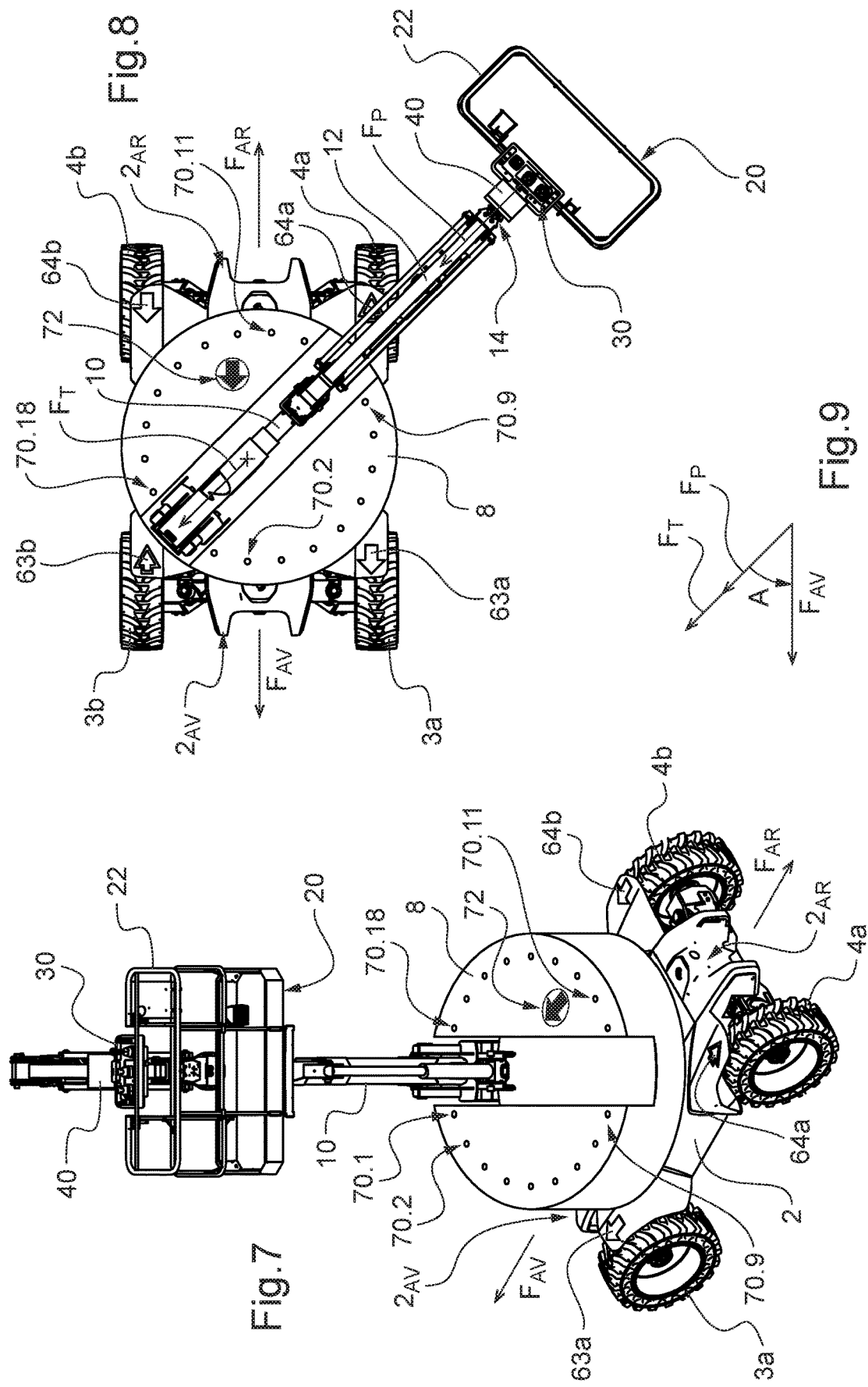

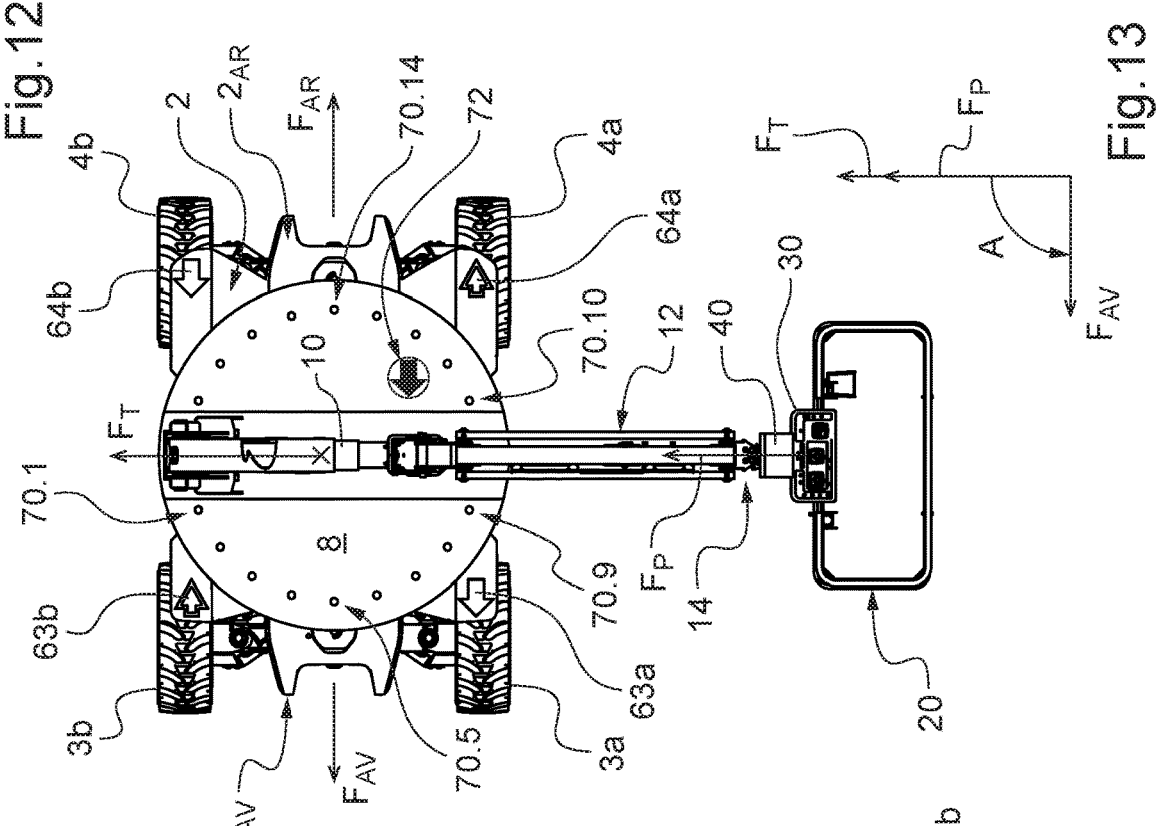

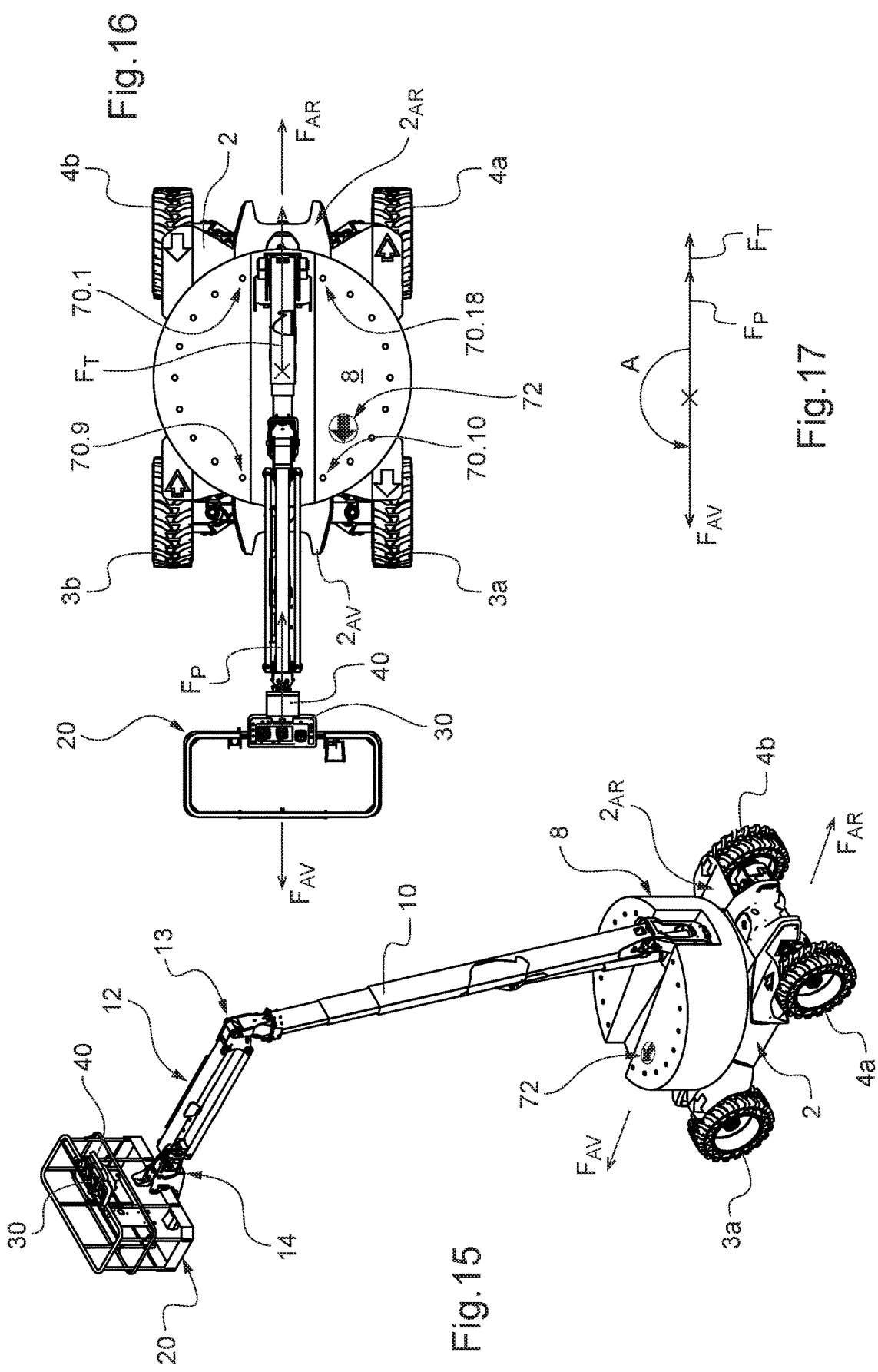

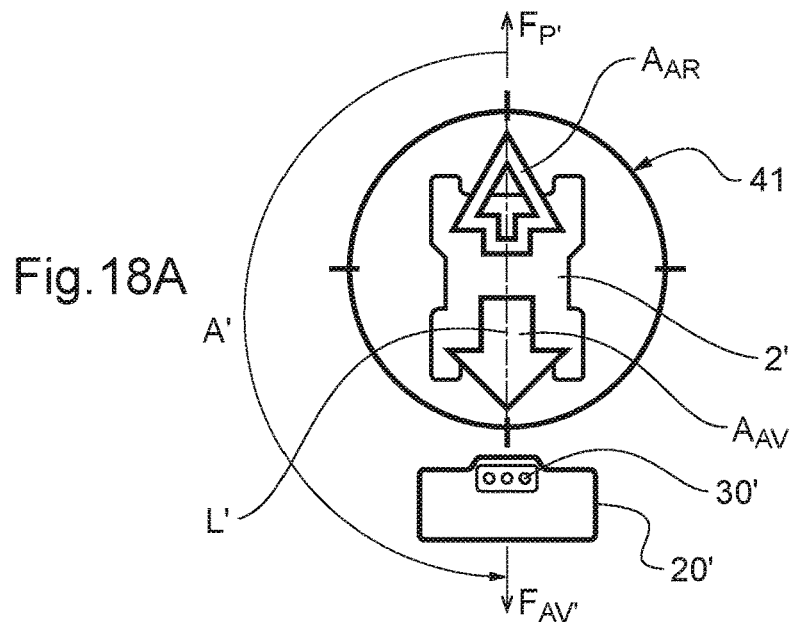
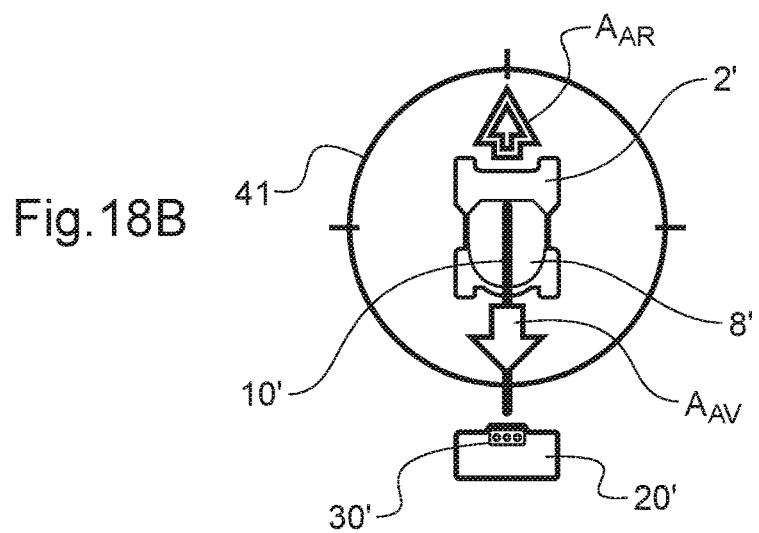
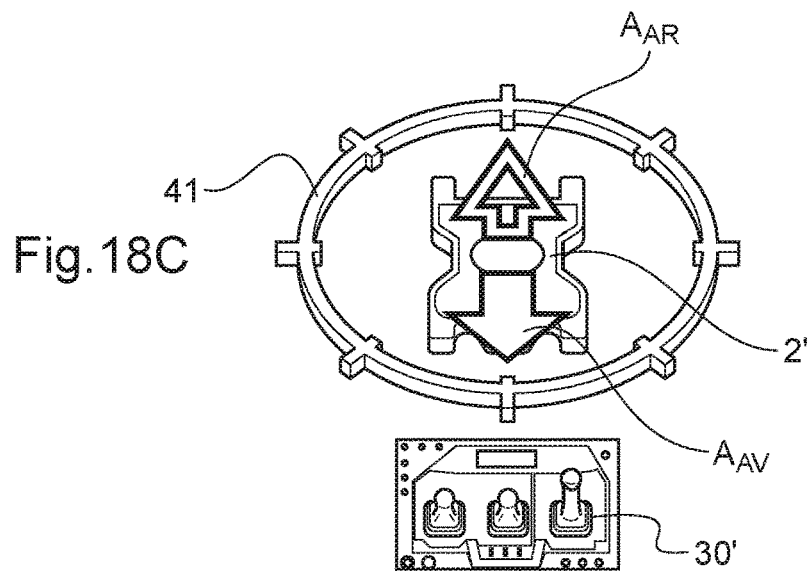

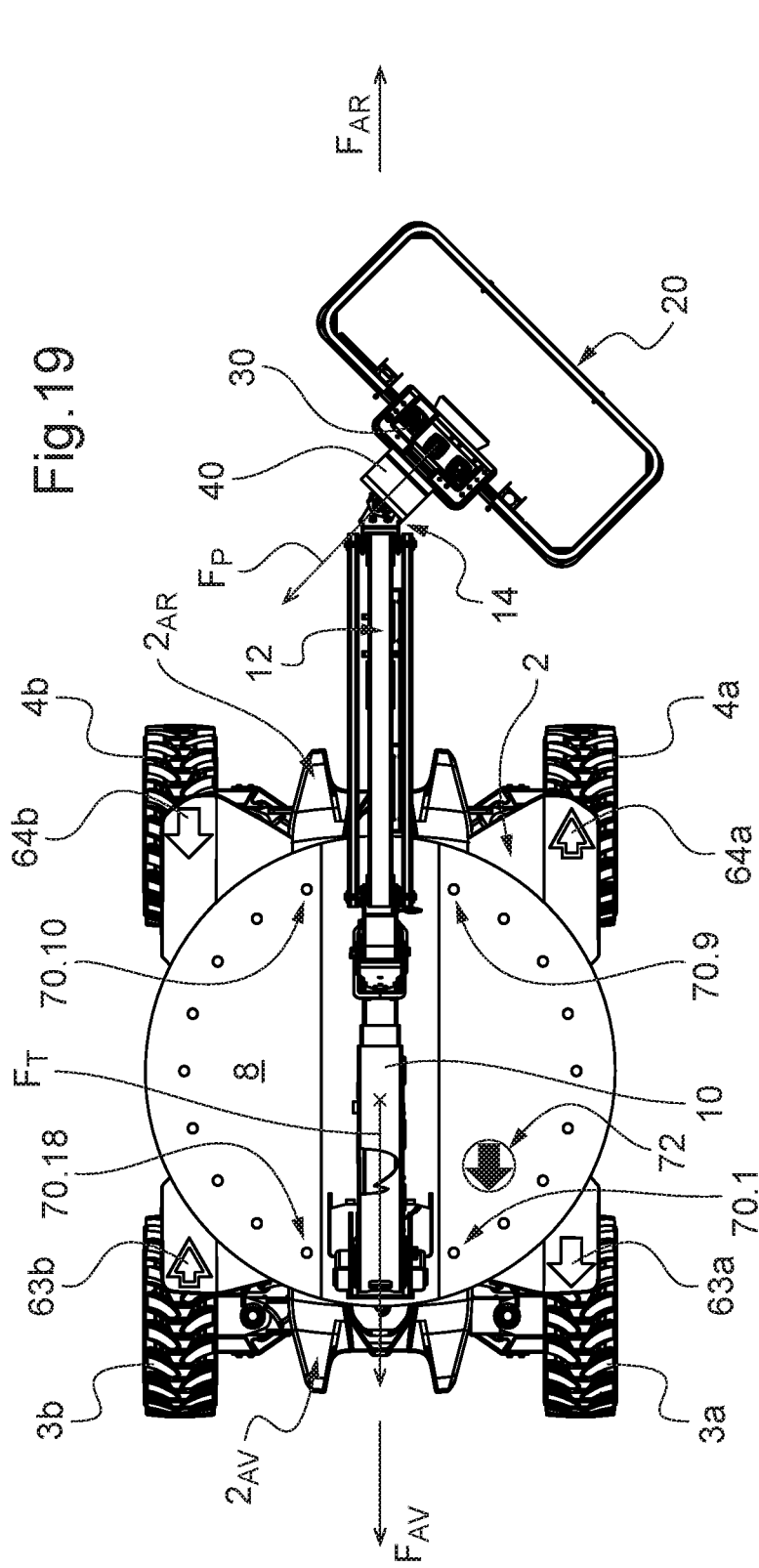
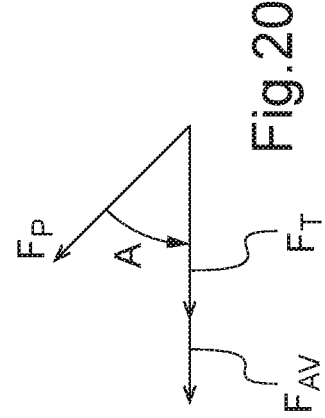

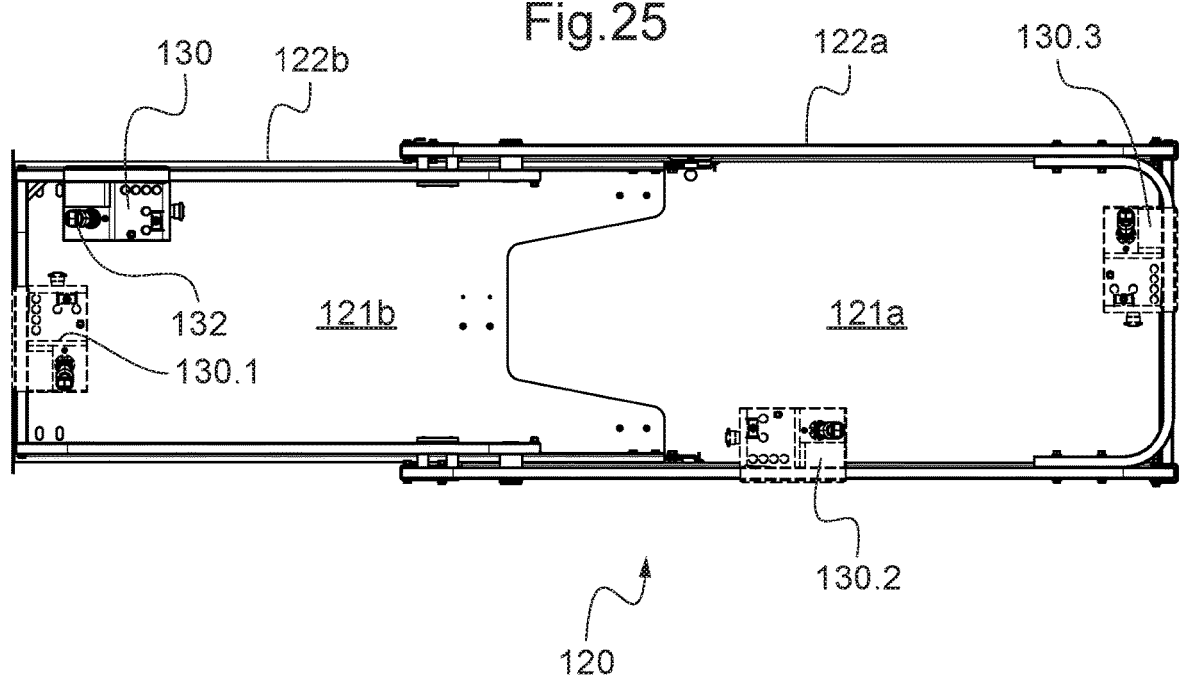
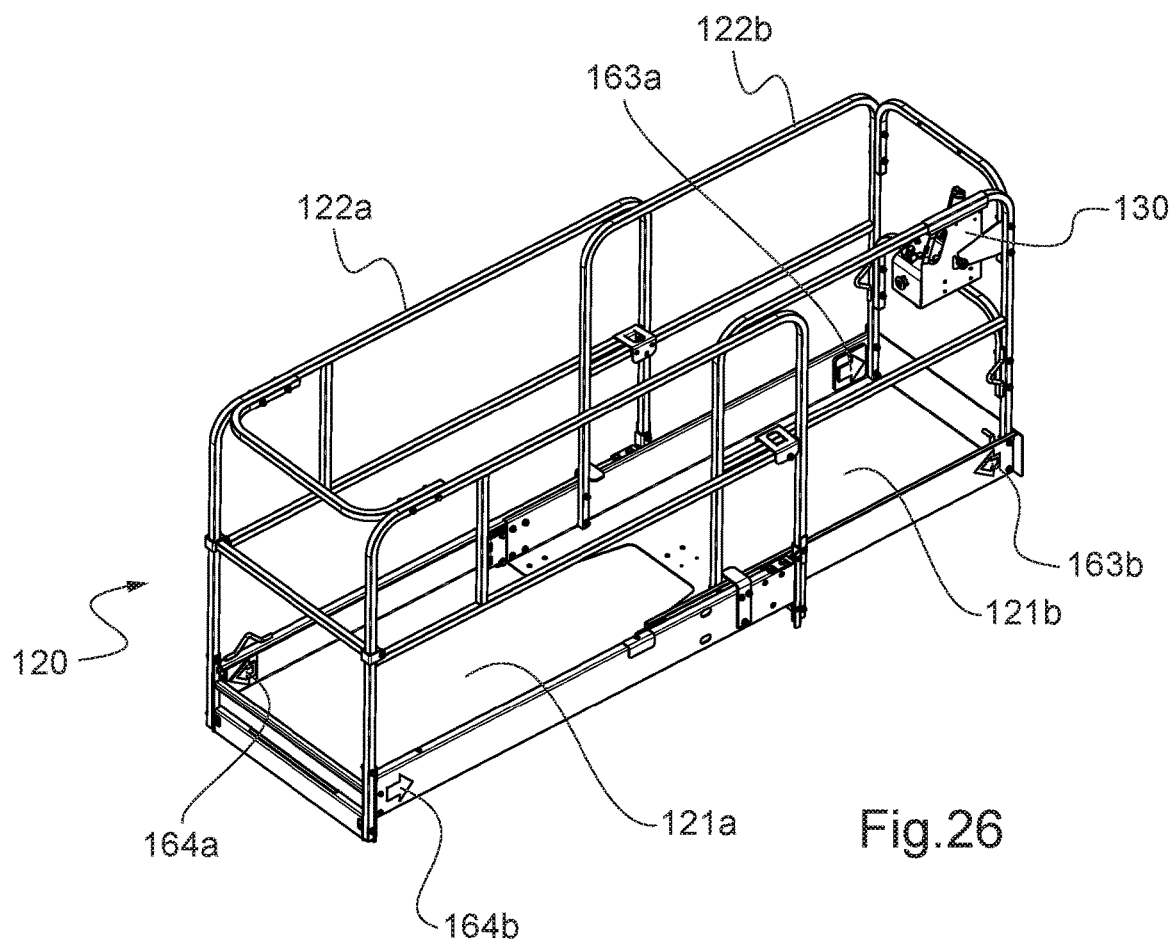

VISUAL ASSISTANCE TO THE ON-GROUND MOVEMENT OF A LIFTING PLATFORM

The present invention relates to the field of mobile elevating work platforms for personnel (also designated by the acronym MEWP), also commonly referred to as aerial work platforms.

Aerial work platforms are machines intended to enable one or more persons to work at a height. They conventionally comprise a chassis, and a lifting structure mounted on the chassis and supporting a work platform intended to receive persons and equipment.

The lifting structure makes it possible to raise the work platform from a lowered position on the chassis to a working position at a height and vice versa. With regard to so-called aerial work platforms with arms, the lifting structure often comprises a turret mounted so as to pivot on the chassis and on which an arm supporting the work platform is mounted, which makes it possible to change the orientation of the arm—and therefore also of the work platform—with respect to the chassis. The arm of the lifting structure is articulated on the turret and is telescopic: this type of lifting platform is commonly referred to as a "telescopic boom lift". The bottom part of the arm, which is mounted on the turret, may further comprise two or more segments articulated on one another, which support the top part of the arm, which is telescopic: this type of lifting platform is commonly referred to as an "articulating boom lift". Hydraulic jacks make it possible to deploy the arm.

Often the lifting structure also comprises a shorter arm—commonly referred to as a pendulum arm—at one end of which the work platform is mounted and which makes it possible to move the latter locally for height. It also generally makes it possible to locally modify the orientation of the work platform by means of a pivot connection with a vertical axis between the end of the pendulum arm and the work platform and sometimes also between the other end of the pendulum arm and the main arm of the lifting structure.

Moreover, the chassis is often motorised and equipped with wheels or tracks for moving the aerial work platform on the ground forwards or backwards.

A control console is generally arranged on the work platform. It enables an operator on board the platform to control the lifting structure in order to reach the required working position at a height and to once again lower it onto the chassis. Generally, it also enables him to control the movement of the aerial work platform on the ground forwards and backwards. Often the control station is provided for this purpose with a control handle articulated in the manner of an aeronautical joystick: inclining it towards oneself, respectively away from oneself, triggers the movement of the aerial work platform on the ground backwards, respectively forwards.

When the operator on board the platform wishes to move the aerial work platform on the ground, there exists a risk that he may be disorientated and confuse the directions of forward and backward movement. This is due to the fact that the platform may be in any orientation with respect to the chassis because, as mentioned previously, the orientation of the platform with respect to the chassis may be modified according to circumstances by the turret and the pendulum arm. This risk is known even more since the turret can generally pivot without limitation of angle with respect to the chassis or at least over an angular movement very much greater than 180°. For example, in the case where the work platform has turned through 180° with respect to the chassis, the direction of movement of the chassis on the ground is reversed compared with the direction of action on the control handle. In the event of confusion, the operator risks causing an accident by moving the aerial work platform in a direction opposite to the one desired.

In order to limit this risk, in application of the European standard EN 280, placing a marking in the form of two arrows with different forms and colours alongside the control handle is known, a first one pointing towards oneself and a second one pointing away from oneself. Markings of arrows with the same form and the same colour are placed on the chassis and point respectively towards the rear and towards the front of the chassis in order to remind the operator of the direction of movement of the chassis on the ground corresponding to each of the two directions in which the control handle is moved.

One drawback of this solution is requiring of the operator an intellectual effort of comparison of the arrows placed alongside the control handle and on the chassis. Because of this, errors are possible, for example in the case of inattention or fatigue on the part of the operator.

FR 2 909 084 A teaches another solution consisting of automatically reversing the agreement between the direction of action on the control handle and the resulting direction of movement of the chassis on the ground according to the orientation of the platform with respect to the chassis in order to make them consistent for the operator on board the platform.

One drawback of this solution is that the operator is not necessarily aware of the reversal of the agreement between the direction of action on the control handle and the resulting direction of movement of the chassis on the ground, even more so if he regularly uses other aerial work platforms for which this solution is not used. There therefore remains a risk of confusion for the operator.

Yet another solution that is used on aerial work platforms in the S-65 series sold under the brand name Genie consists of automatically inhibiting the control for moving the aerial work platform on the ground when the orientation of the lifting arm of the work platform with respect to the chassis has exceeded a predetermined angle. An indicator light then comes on on the control console and the operator can reactivate the ground movement control by means of a validation switch on the control station. Corresponding explanations are marked on the control console.

One drawback of this solution there also lies in the fact that the automatic inhibition of the ground movement control and the need to actuate a validation switch in order to reactivate it are sources of complication for the operator that may also disconcert him if he is not used to them, even more so if the explanations on the console are no longer legible or in a language unknown to the operator.

The risk of disorientation of the operator and of confusion of the directions of forward and backward movement also exists in the case of so-called "vertical mast" aerial work platforms. This is because the lifting structure of the work platform generally comprises a pivoting turret mounted on the chassis and a telescopic mast mounted vertically on the turret. The work platform is generally supported by the top end of the vertical mast by means of a shorter arm of the pendular type.

The risk of disorientation of the operator and confusion of the directions of forward and backward movement also sometimes exists in the case of aerial work platforms where the work platform always has the same orientation with respect to the chassis. This is the case with so-called "scissor" aerial work platforms where the lifting structure consists of a scissor mechanism. This allows only a vertical movement of the work platform. The control console is sometimes designed to be movable by the operator so as to be able to attach it removably at various places on the guardrail, for example on the front side or on the rear side of the work platform, which has the effect of reversing the direction of action on the control handle with respect to the direction of movement of the chassis on the ground. This difficulty exists more generally when the control console is removable in this way, whatever the technology of the lifting system of the work platform. Sometimes the control console is even designed so that the operator can hold it in one hand and manipulate its control members with the other, which in particular makes it possible to control the aerial work platform from the ground instead of from the platform. In this case also, the risk of confusion of the directions of forward and backward movement exists.

In addition, U.S. Pat. No. 7,194,358 B2 describes a scissor-type aerial work platform comprising an anti-collision system that includes an indicator device mounted on the aerial work platform in any place easily visible to an operator. The indicator device comprises a steering direction indicator that shows the angle of the steered wheels of the aerial work platform. The steering direction indicator further comprises an arrow head pointing in the direction in which the aerial work platform would move if the manual control member for triggering forward travel were activated. In other words, the arrow head points permanently in the direction of forward movement of the aerial work platform, it being of no importance whether a movement of the aerial work platform is selected or not with the control member and of no importance which forward or backward movement direction is actually selected.

Consequently, this indicator provides only limited assistance to the operator for actuating as necessary the manual control in order to move the chassis on the ground in the forward or backward direction actually required. In particular, this solution also requires of the operator an intellectual effort for choosing in which direction to actuate the manual control member depending on whether he wishes to trigger the forward or backward movement direction by comparison with the forward direction pointed to by the indicator in the form of an arrow. In addition, such an indicator risks disorienting the operator and confusing him since it indicates the direction opposite to the direction of movement in the case where the operator triggers reverse travel. Because of this, errors remain possible, in particular in the case of inattention or fatigue on the part of the operator. The drawbacks are even worse if this solution were applied to a turret-type aerial work platform and/or one having a control station that is removable and movable on the work platform for the reasons already mentioned with regard to the other corresponding existing solutions.

One aim of the present invention is to improve the prior art. It aims in particular to provide a solution limiting to the maximum possible extent the risk of the operator at the control console mistaking the direction of forward or reverse movement of the chassis on the ground, while ensuring simplicity of use of the commands for movement of the chassis on the ground, even when he is not accustomed to manoeuvring aerial work platforms using this solution.

To this end, the present invention proposes, according to a first aspect, a self-propelled aerial work platform comprising:
  a chassis having a longitudinal axis along which the chassis is able to move on the ground in a forward direction and in a backward direction opposite to the forward direction,
  a work platform,
  a lifting structure mounted on the chassis and supporting the work platform,
  a control console for:
    controlling the lifting structure in order to move the platform to a working position at a height, and
    selectively moving the chassis on the ground in the forward direction and the backward direction, and
  a visual signalling system for indicating the direction of movement of the chassis on the ground selected at the control station by activating at least one visual indication:
    located on the side of the chassis that corresponds to the direction of movement selected, or
    having an oriented form pointing in the direction of movement selected.

In other words, when one of the forward or backward directions is selected on the control console, the signalling system changes at least one visual indication as defined from the inactive state to the active state. The operator is thus informed by the visual signalling system of the direction of movement selected without having to supply any comparison effort, and this whatever the orientation of the chassis with respect to the control console. This solution does not demand any particular requirement as to the functioning of the member or members controlling the movement of the chassis on the ground with which the control console is provided. It may conventionally be a control handle articulated in the manner of an aeronautical joystick for which any one direction of actuation always causes the movement of the chassis on the ground in the same direction.

The visual indication is preferentially provided at places on the aerial work platform where it is easily visible, in particular from the work platform where the operator usually stands, and more particularly from the control console if it is fixed at a predetermined place—or at a preferential fixing place if it is removable—on the work platform. The fact that the visual indicator has an oriented form pointing in the direction of movement selected is particularly advantageous since this confers great flexibility in the choice of the location of the visual indication on the aerial work platform.

Provision may be made for the signalling system to simultaneously activate a plurality of visual indications situated at various places on the aerial work platform that all indicate the direction of movement selected. In this way, the probability of the operator being able to see at least one of them can be maximised, whatever the place where he stands, in particular in the case where the console is removable.

Naturally, it is preferable for the signalling system to be designed to make the at least one visual indication change back from the active state to the inactive state when the corresponding direction of movement ceases to be selected at the control console.

According to a first preferred embodiment of this first aspect of the invention, the visual signalling system comprises at least one visual indicator secured to the chassis that the visual signalling system activates to procure the visual indication of at least one of the forward and back directions.

This first preferred embodiment can advantageously be supplemented by one or more of the following features:
the visual signalling system comprises:
  a first and a second visual indicator secured to the chassis and located on the front side of the chassis, and
  a third and a fourth visual indicator secured to the chassis and located on the rear side of the chassis, wherein:
the visual signalling system activates the first and third visual indicators in order each to procure the visual indication of the forward direction in the form of an oriented form pointing in the forward direction, and
the visual signalling system activates the second and fourth visual indicators in order each to procure the visual indication of the backward direction in the form of an oriented form pointing in the backward direction;
the first and fourth visual indicators are further located towards a same lateral side of the chassis, and the second and third visual indicators are further located towards the other lateral side of the chassis;
the chassis is mounted on two front wheels and two rear wheels by means of which the chassis runs on the ground, and each of said visual indicators is arranged above a respective one of the wheels;
the lifting structure comprises a turret mounted so as to pivot about a vertical axis on the chassis, and a mechanism for lifting the work platform that is mounted on the turret, the work platform being offset on one side with respect to the turret, said visual indicators being located so that at least two of them succeeding each other on the periphery of the chassis on the side corresponding to the platform are free from superimposition by the turret, whatever the orientation of the turret with respect to the chassis.

According to a preferred second embodiment, the lifting structure comprises a turret mounted so as to pivot about a vertical axis on the chassis, and a mechanism for lifting the work platform that is mounted on the turret, the visual signalling system comprising:
at least one sensor for determining the orientation of the turret with respect to the chassis, and
at least one visual indicator arranged on the turret that the visual signalling system activates in order to procure the visual indication of at least one of the forward and backward directions.

In this second embodiment, it is advantageous that the visual signalling system comprises a plurality of visual indicators arranged on the turret and distributed angularly around the vertical axis of the turret, the signalling system procuring the visual indication of at least one of the forward or backward directions by activating at least one of the visual indicators located on the corresponding longitudinal side of the chassis.

According to a third preferred embodiment, the orientation of the work platform is fixed with respect to the chassis, the lifting structure preferentially being a scissors mechanism, and the visual signalling system comprises at least one visual indicator secured to the work platform that the visual signalling system activates in order to procure the visual indication of at least one of the forward and backward directions.

In this third embodiment, it is advantageous that the visual signalling system comprises at least two luminous indicators secured to the work platform, one pointing in the forward direction and the other pointing in the backward direction, and that the visual signalling system is designed to activate whichever of the indicators points in the direction of movement selected at the control console from the forward and backward directions while the other is maintained inactive.

Even more advantageously, provision may be made for the visual signalling system to comprise four luminous indicators secured to the work platform, two of them being arranged towards the front of the platform and each pointing in another of the forward and backward directions and the other two being arranged towards the rear of the platform and each pointing in another of the forward and backward directions, and for the visual signalling system to be designed to activate those of the four indicators pointing in the direction of movement selected at the control console from the forward and backward directions while the others are maintained inactive.

Moreover, said at least one luminous indicator or one or more of said luminous indicators or all are preferably arranged on or integrated in toeboards framing the bottom of a guardrail of the work platform. Advantageously said at least one luminous indicator or one or more of said luminous indicators or all are arranged passing through the toeboards or duplicated on the inside and outside of the corresponding toeboard so as to be visible both from the inside and the outside of the work platform.

For the purpose mentioned above, the present invention also proposes, according to a second aspect, a self-propelled aerial work platform comprising:
a chassis having a longitudinal axis along which the chassis is able to move on the ground in a forward direction and in a backward direction opposite to the forward direction,
a work platform,
a lifting structure mounted on the chassis and supporting the work platform,
a control console for:
controlling the lifting structure in order to move the platform to a working position at a height, and
selectively moving the chassis on the ground in the forward direction and the backward direction, and
a visual signalling system for indicating the direction of movement of the chassis on the ground selected at the control console by activation on a display device, preferably a display screen, of at least one visual indication
located on the side corresponding to the selected direction of movement on a display of the azimuthal direction of the chassis with respect to the display device, or
having a form oriented in the azimuthal direction of the chassis with respect to the display device and pointing in the direction corresponding to the direction of movement selected,
the visual signalling system comprising at least one sensor for determining the azimuth of the chassis with respect to the display device.

The invention according to this second aspect has the same advantages as for the first aspect described above. This is because, when one of the forward or backward directions is selected at the control console, the signalling system changes the at least one visual indication as defined from the inactive state to the active state on the display device. The operator is therefore also informed of the selected direction of movement without any particular effort on his part, since the display device takes account of the direction of movement selected on the basis of a display of the azimuthal direction of the chassis with respect to the display device. The orientation of the azimuthal direction of the chassis thus displayed agrees with the orientation of the longitudinal axis of the chassis. Because of this, the operator has immediate understanding of the direction of movement selected by virtue of the display device. There also, it is preferable for the signalling system to be designed to make the at least one visual indication on the display device to go from the active state to the inactive state again when the corresponding direction of movement ceases to be selected at the control console.

According to a preferred embodiment of the invention according to this second aspect, the visual signalling system is configured to display, on the display device, a graphical representation of the chassis oriented in the azimuthal direction of the chassis with respect to the display device. Moreover, it is advantageous for the display device to be fixed to the control console.

Whether in the case of the invention according to the first aspect described above or according to the second aspect that has just been described, the control console may be mounted fixedly on the work platform or with an orientation fixed with respect thereto. In this case, with regard to the invention according to the second aspect, it is advantageous for the visual signalling system also to be configured to display, on the display device, a graphical representation of the work platform and/or of the control console oriented in their azimuthal direction with respect to the display device.

Alternatively, the control console can be designed to be freely movable by the operator during the use of the aerial work platform. In this case, the control console is preferably designed to be attached removably at various places on a guardrail of the work platform. It may in particular be a case of a scissor aerial work platform or a vertical-mast aerial work platform.

Finally, provision may be made for the control console to comprise at least one ground movement control member that can be actuated by the operator in order to selectively move the chassis on the ground in the forward direction and in the backward direction, and for the work platform or the control console to comprise a validation member that can be actuated by the operator and for the aerial work platform to inhibit the movement of the chassis on the ground according to the actuation or absence of actuation of the validation member, the visual signalling system indicating the direction of movement selected at the at least one control member by activation of the at least one visual indication despite the inhibition of the movement of the chassis on the ground. This enables the operator to check the direction of movement selected before moving the chassis on the ground.

It will be understood that the invention is particularly advantageous especially for cases where the lifting structure comprises a turret mounted so as to pivot about a vertical axis on the chassis, and a mechanism for lifting the work platform that is mounted on the turret. However, more generally still, it is particularly advantageous for any aerial work platform for which the azimuth of the chassis with respect to the control console is liable to vary during use of the aerial work platform.

Other features and advantages of the invention will emerge from a reading of the following description of a preferred embodiment of the invention, given by way of example and with reference to the accompanying drawing.

FIGS. 1 and 2 show respectively a perspective view and a plan view of an arm-type aerial work platform equipped with a visual signalling system according to the invention, the lifting structure and the work platform of the aerial work platform being in a first configuration in which the orientation of the chassis and the orientation of the control console of the platform correspond to one another.

FIG. 3 shows, by means of arrows, the relative orientations of the chassis, the turret and the control console of the aerial work platform in the configuration thereof in FIGS. 1 and 2.

FIGS. 4 and 5 show respectively a perspective view and a plan view of the work platform of the aerial work platform of FIGS. 1 and 2.

FIGS. 7, 8, 9, 10A, 10B, 10C correspond to FIGS. 1, 2, 6A, 6B, 6C respectively, but for a configuration of the aerial work platform in which the chassis is oriented at 45° with respect to the control console of the platform because of a change in orientation of the turret with respect to the chassis.

FIGS. 11, 12, 13, 14A, 14B, 14C correspond to FIGS. 1, 2, 3, 6A, 6B, 6C respectively, but for a configuration of the aerial work platform in which the chassis is oriented at 90° with respect to the control console of the platform.

FIGS. 15, 16, 17, 18A, 18B, 18C corresponds, to FIGS. 1, 2, 3, 6A, 6B, 6C respectively, but for a configuration of the aerial work platform in which the chassis is oriented at 180° with respect to the control console of the platform.

FIGS. 19, 20, 21A, 21B, 21C correspond to FIGS. 2, 3, 6A, 6B, 6C respectively, but for a configuration of the aerial work platform in which the chassis is oriented at 45° with respect to the control console of the platform because of a change in orientation of the work platform with respect to the lifting structure.

Figure 6A:
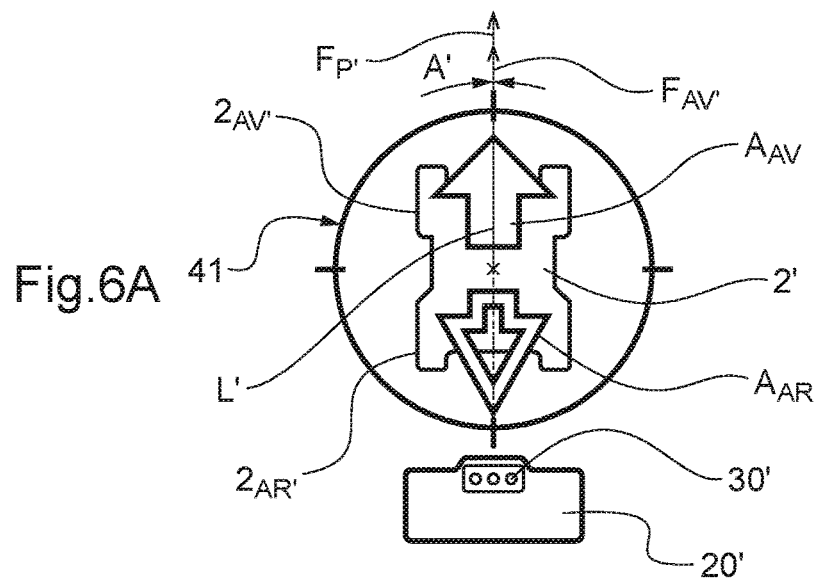
FIGS. 6A, 6B, 6C illustrate three variants of the display on the screen of the control console for the aerial work platform of FIGS. 1 and 2 in the corresponding configuration.
Figure 6B:
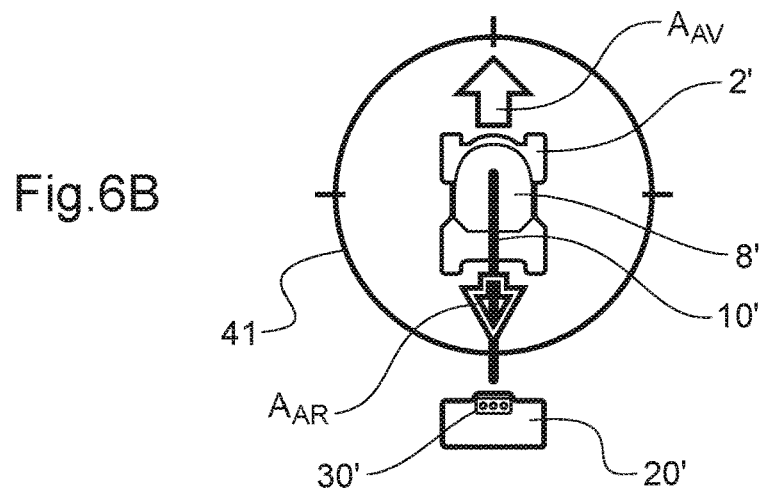
Figure 6C:
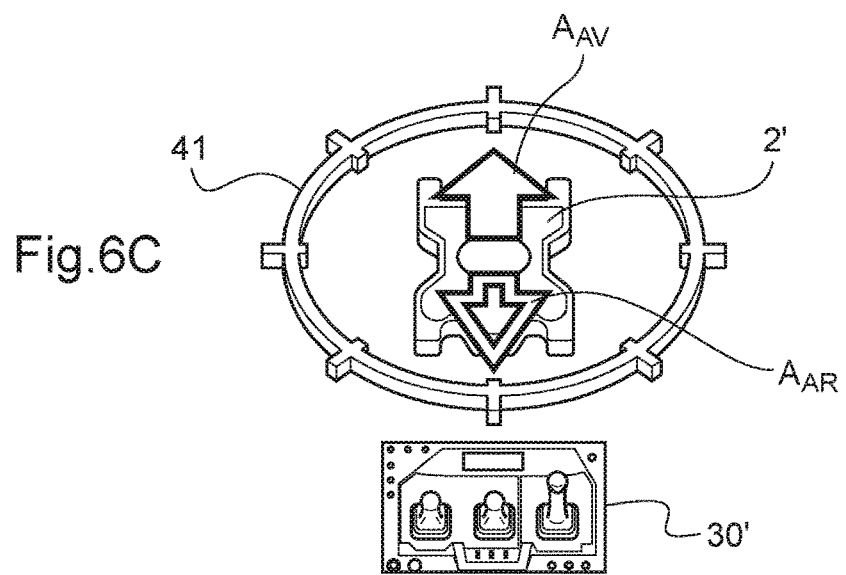
Figure 10A:
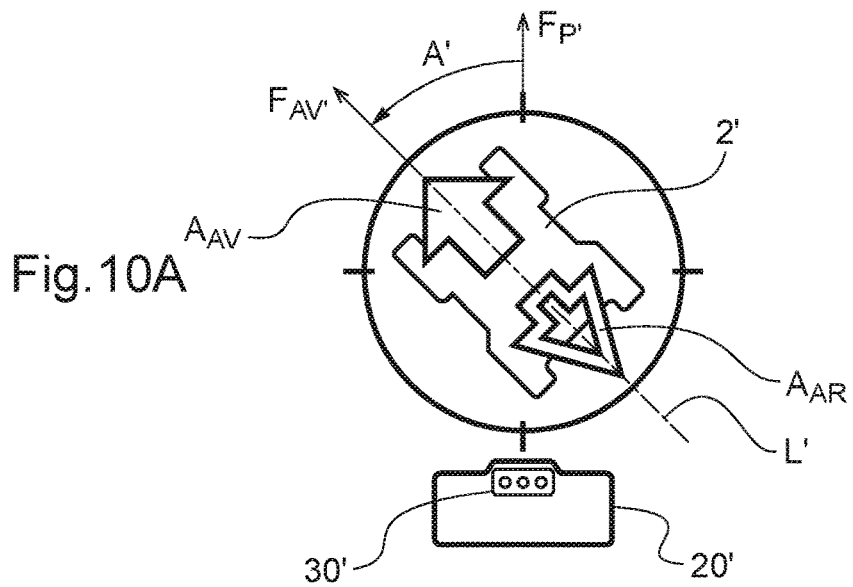
Figure 10B:
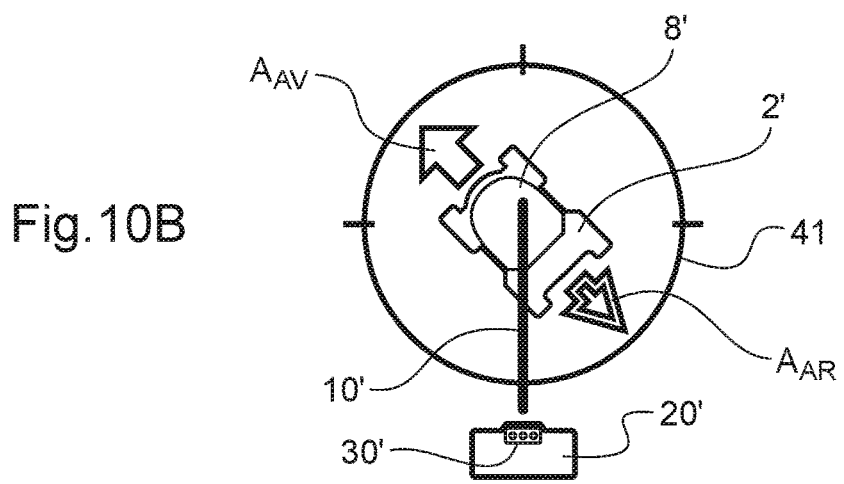
Figure 10C:
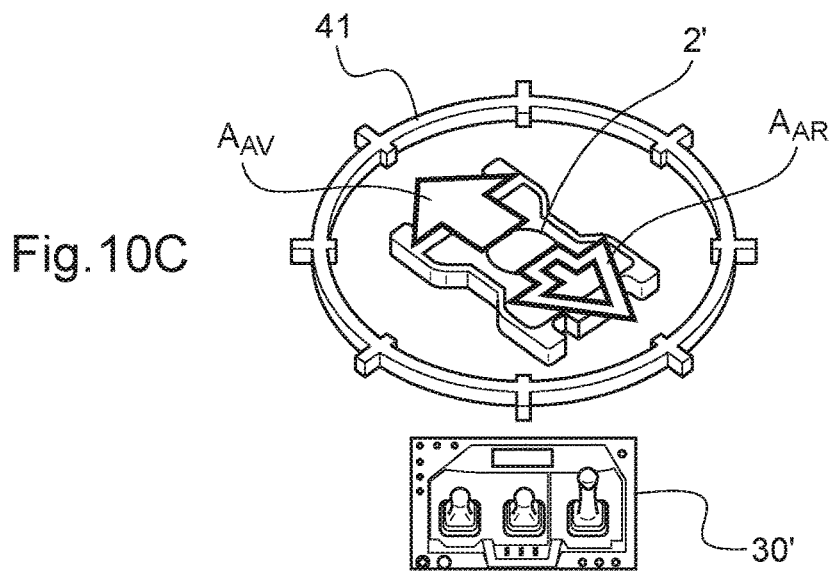
Figure 14A:
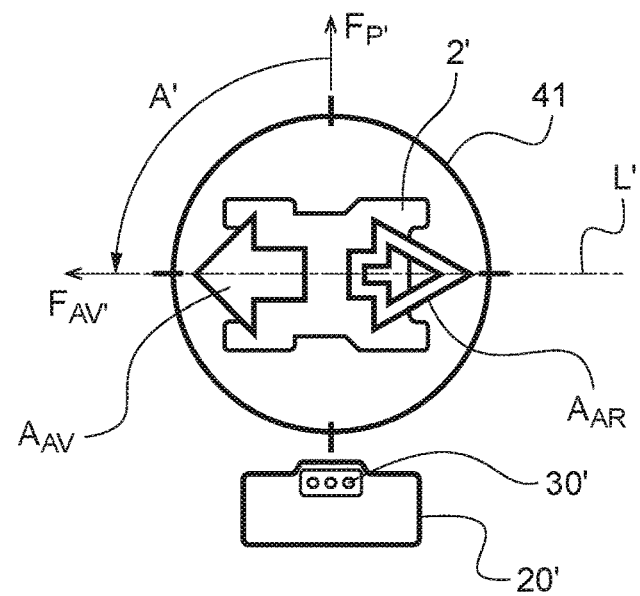
Figure 14B:
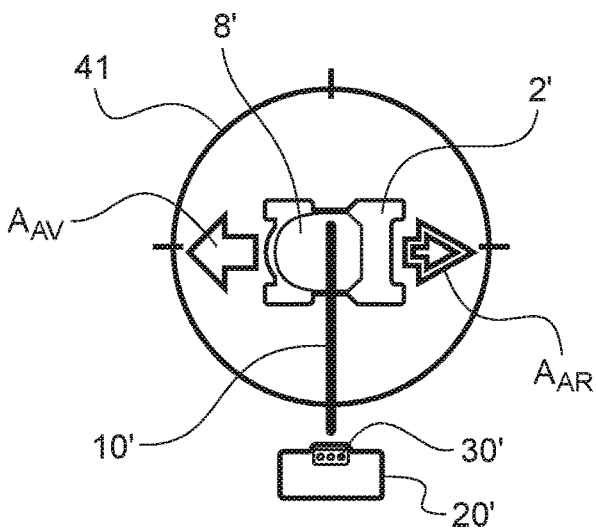
Figure 14C:
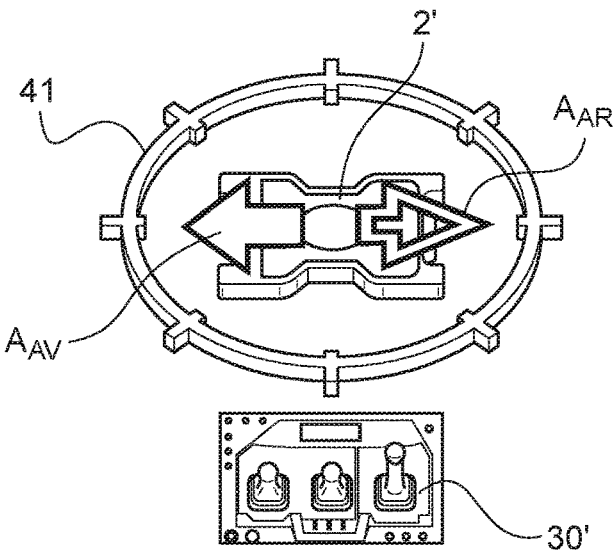
Figure 21A:
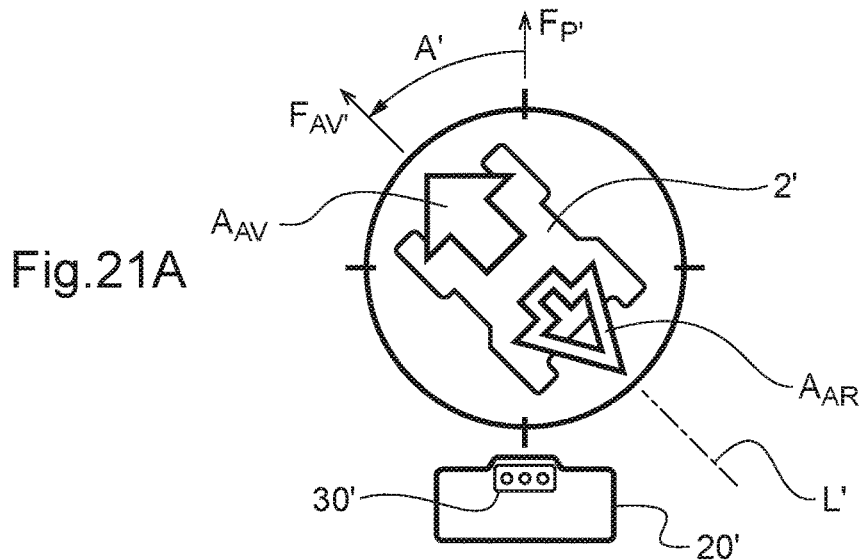
Figure 21B:
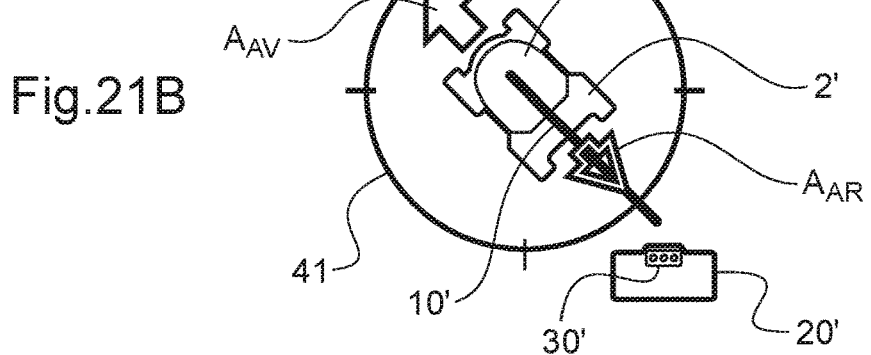
Figure 21C:
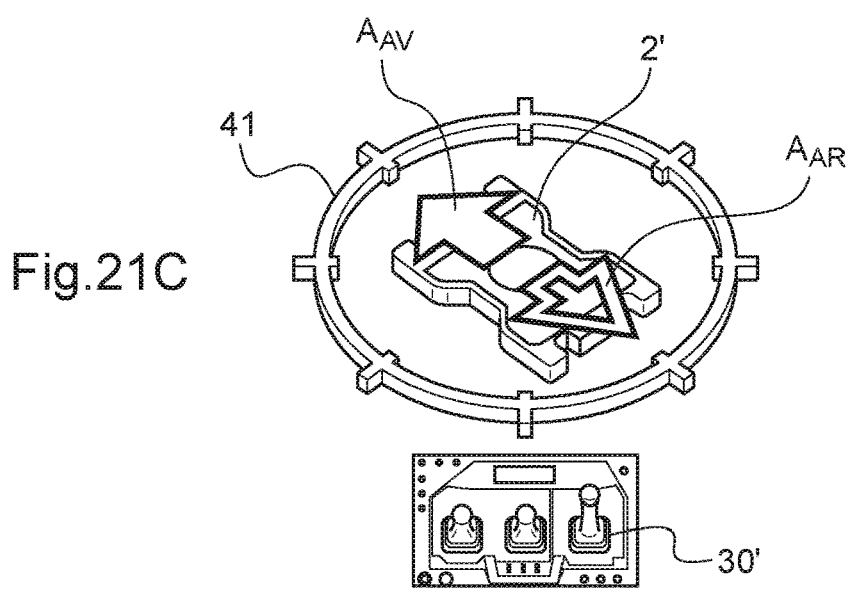
Figure 22:
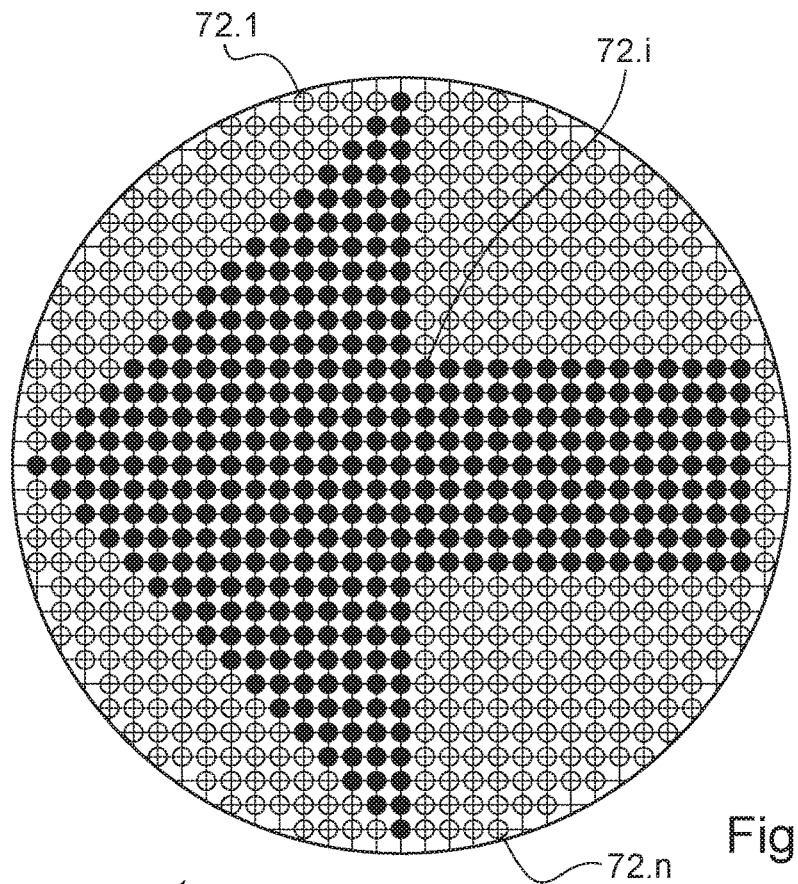

FIG. 22 is a detail view of the luminous display arranged on the turret of the aerial work platform that serves to display an arrow indicating the direction of movement of the chassis on the ground.

Figure 23:
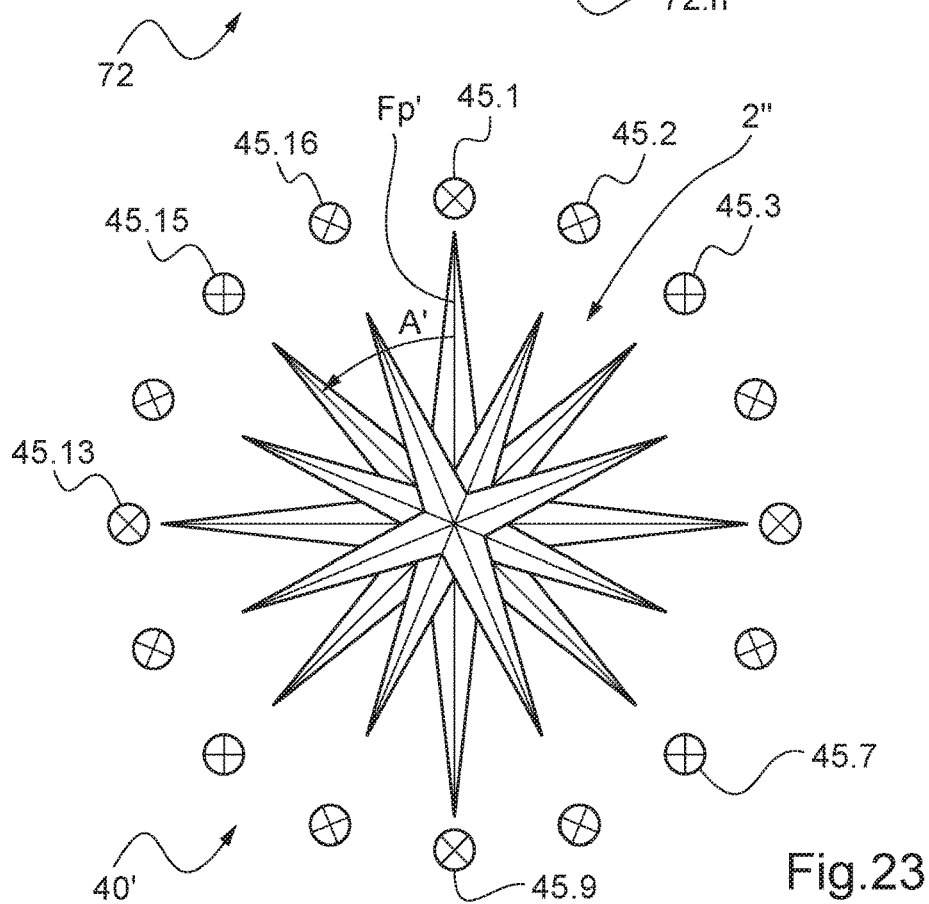

FIG. 23 illustrates a simplified device for displaying the direction of movement of the chassis on the ground that can be arranged on the control console.

Figure 24:
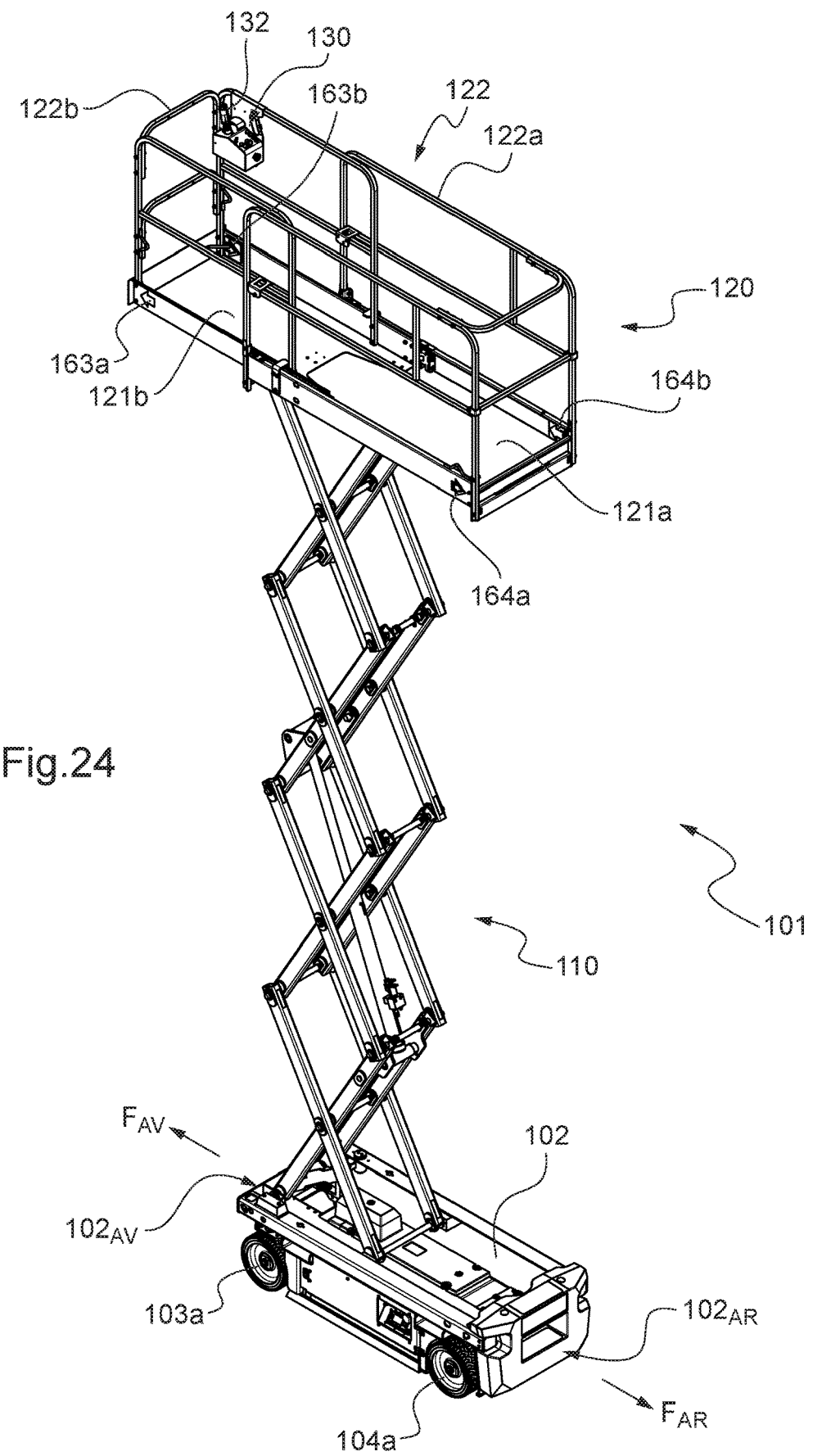

FIG. 24 is a perspective view of a scissor aerial work platform equipped with a visual signalling system according to the invention.

FIG. 25 is a plan view of the work platform of the aerial work platform of FIG. 24 that illustrates several possible positions of the control console on the work platform.

FIG. 26 is a perspective view of the work platform of the aerial work platform of FIG. 24 but observed from a viewpoint on the other side of the aerial work platform.

In the embodiment shown, the aerial work platform 1 comprises a chassis 2 having a longitudinal axis L with respect to which a front side $2_{AV}$ and a rear side $2_{AR}$ of the chassis 2 are conventionally defined. It is mounted on two front wheels 3a, 3b and two back wheels 4a, 4b to enable the chassis 2 to move on the ground. Consequently the chassis 2 moves on the ground and therefore along the longitudinal axis L of the chassis 2. In a variant, the chassis 2 may be equipped with members for running on the ground other than wheels, for example tracks.

With regard to a self-propelled aerial work platform, the chassis 2 is motorised for rotating at least two of the wheels in order to move the chassis 2 longitudinally on the ground at choice in the forward direction $F_{AV}$ or in the backward direction $F_{AR}$ opposite to the forward direction $F_{AV}$, it being stated that these two directions are defined in agreement with the front $2_{AV}$ and rear $2_{AR}$ sides of the chassis 2. The front wheels 3a, 3b and/or the back wheels 4a, 4b are preferably steered.

The aerial work platform 1 comprises a lifting structure 6 supporting a work platform 20 designed to receive one or more persons and equipment.

The lifting structure 6 comprises a turret 8 mounted so as to pivot about a vertical axis Z on the chassis 2. The turret 8 is preferably arranged on the chassis 2 so as to be able to turn about the vertical axis Z without any limitation as to angle. In a variant, the maximum extent of rotation of the turret 8 on the chassis 2 is limited and is less than or equal to 360°, but preferably greater than 300°.

The aerial work platform 1 is in this case a telescopic boom lift. Because of this, the lifting structure comprises a telescopic arm 10 mounted on the turret 8. The arm 10 is articulated on the turret 8 in order to be able to lower and raise it with respect thereto. Hydraulic jacks make it possible to actuate the arm 10 in order to lower and raise it with respect to the turret 8, as well as to extend or retract it.

At the top end 13 of the arm 10, a shorter arm 12 is mounted, commonly referred to as a pendular arm. The platform 20 is mounted at the other end 14 of the arm 12. In this case, the platform 20 is articulated on the arm 12 with the possibility of pivoting about a horizontal axis and about a vertical axis. The arm 12 is articulated on the arm 10 with the possibility of pivoting only about a horizontal axis. The angular movement of the platform 20 about the horizontal axis is preferably less than ±90° with respect to the arm 12. In a variant, the arm 12 also has a possibility of pivoting about a vertical axis with respect to the arm 10, in which case the angular movement of the arm 12 about the vertical axis is preferably less than ±180° with respect to the arm 10. Jacks make it possible to pivot the arm 12 with respect to the arm 10 and the platform 20 with respect to the arm 12. The arm 12 thus makes it possible to move the platform 20 locally—that is to say with respect to the arm 10—for height, as well as its orientation, or even also laterally where applicable.

As can be seen best in FIGS. 3 and 4, the platform 20 has a guardrail 22 and a control console 30. In this case, the control console 30 is mounted fixedly on a part of the guardrail 22 or at least with an orientation that is fixed with respect to the platform 20, which means that the azimuth of the work platform 20 with respect to the control console 30 is fixed. In this case, it is the part of the guardrail 22 on the side where the platform 20 is mounted on the arm 12.

The console 30 comprises various control members 31 enabling an operator on board the platform 20 to control the lifting structure 6 in order to move the platform 20 to a working position at a height and to then make it return to a lowered retracted position on the chassis 2. In our example, the console 30 makes it possible to cause movements according to the various possibilities described above. In order words, it enables the operator to pivot the turret 8 on the chassis 2, to pivot the arm on the turret 8 and to deploy it or retract it, and to move the platform 20 locally by means of the arm 12. For the comfort and safety of the operator on board the platform 20 when the aerial work platform 1 is in use, the latter is equipped with a hydraulic or electronic device that maintains the platform 20 substantially parallel to the ground when the arm 10 is pivoted on the turret 8. Similarly, the platform 20 remains parallel to the ground when the arm 12 pivots with respect to the arm 10 about the horizontal axis, for example by means of a deformable parallelogram structure of the arm 12.

The console 30 also comprises at least one manually actuated control member enabling the operator to move the chassis 2 on the ground at choice in the forward direction $F_{AV}$ or in the backward direction $F_{AR}$ as well as pivoting the steered wheels of the chassis 2. In this case, it is a control handle 32 articulated like an aeronautical joystick: inclining it towards the ground, respectively opposite to the ground, triggers the movement of the chassis 2 in its backward direction $F_{AR}$, respectively in its forward direction $F_{AV}$.

The console 30 may also comprise a display device preferably in the form of a screen 40, for example a liquid crystal screen, the use of which will be described later.

A validation member 50—also commonly referred to as a "dead man's handle"—inhibits the aforementioned control members of the console 30 if it is not actuated simultaneously by the operator. In the example shown, it is a pedal for actuation by foot arranged on the deck of the platform 20.

FIGS. 1 and 2 illustrate the platform 20 in a raised position. In the position shown, the turret 8 and the platform 20 are each in an initial orientation with respect to the chassis 2, that is to say their preferential orientation in the idle position of the lifting structure 8 when the aerial work platform 1 is not in service, the arm 10 being lowered and retracted on the turret 8.

In this initial orientation of the turret 8, the longitudinal axis of the arm 10 lies in the longitudinal mid-plane of the chassis 2 (this is coincident with the longitudinal axis L in FIG. 2).

As can be seen, in this initial orientation, the arm 10 extends towards the rear $2_{AR}$ of the chassis 2 so that the platform 20 is situated at the rear of the chassis 2.

Hereinafter, the orientation of the turret 8 will be defined by a horizontal arrow $F_T$ linked to the turret 8 that is directed in the forward direction $F_{AV}$ of the chassis in this initial orientation of the turret 8, while the orientation of the chassis 2 will be defined with reference to its forward movement direction $F_{AV}$.

In its initial orientation, the platform 20 is positioned perpendicular to the vertical plane containing the longitudinal axes of the arms 10 and 12. Because of this, an operator on board the platform 20 standing in front of the console 30 and looking straight in front of him is looking in the direction $F_T$ of the turret 8 and therefore also in the direction $F_{AV}$ in the configuration in FIGS. 1 and 2 because the turret 8 is also in its initial orientation.

As a result, in the configuration in FIGS. 1 and 2, the direction of action on the control handle 32—that is to say either towards the operator or in the opposite direction—to move the aerial work platform 1 on the ground agrees with the corresponding direction of movement of the chassis 2—that is to say respectively in the backward direction $F_{AR}$ and in the forward direction $F_{AV}$.

Hereinafter, the orientation of the console 30 will be defined by a horizontal arrow $F_P$ linked to the console 30 that is directed—when the platform 20 is in its initial orientation—in the same direction as the arrow $F_T$ of orientation of the turret 8.

FIG. 3 shows the orientation arrows $F_{AV}$, $F_T$ and $F_P$ corresponding respectively to the chassis 2, to the turret 8 and to the console 30 for the aerial work platform 1 in the configuration in FIGS. 1 and 2. The oriented angle—referenced A—between the arrows $F_P$ and $F_{AV}$ is also indicated thereon, the arrow $F_P$ serving as a reference. This angle A corresponds to the azimuth of the chassis 2 with respect to the console 30. It is 0° in the configuration in FIGS. 1 and 2.

Because of the various possibilities of pivoting about vertical axes of the platform 20 with respect to the chassis 2 namely in our example the rotation of the turret 8 on the chassis 2 and the pivoting of the platform 20 with respect to the arm 12—the orientation of the platform 20—and therefore of the console 30—with respect to the chassis 2 may vary. In other words, the azimuth A of the chassis with respect to the console 30 may vary. This possibility is illustrated in FIGS. 7, 8, 11, 12, 15 and 16 for various orientations of the turret 8 with respect to the chassis 2, the orientation of the platform 20 with respect to the turret 8 being unchanged.

More particularly, in the configuration in FIGS. 7 and 8, the turret 8 has pivoted by 45° with respect to the chassis 2 and the azimuth A is then 45°: cf. FIG. 9.

In the configuration in FIGS. 11 and 12, the turret 8 has pivoted by 90° with respect to the chassis 2 and the azimuth A is then 90°: cf. FIG. 13. In this case, the directions of action on the control handle 32 in order to move the aerial work platform 1 on the ground are perpendicular with respect to the movement directions $F_{AV}$ and $F_{AR}$, which may be confusing and a source of error for the operator.

In the configuration in FIGS. 15 and 16, the turret 8 has pivoted by 180° with respect to the chassis 2 and the azimuth A is then 180°: cf. FIG. 17. The directions of action on the control handle 32 in order to move the aerial work platform 1 on the ground are then reversed with respect to the movement directions $F_{AV}$ and $F_{AR}$, which may create a risk of confusion and error for the operator.

In the configuration in FIG. 19, the turret 8 is in its initial orientation—the arrows $F_T$ and $F_{AV}$ have because of this the same direction—but the platform 20 has pivoted by 45° with respect to the arms 10 and 12. Because of this, the azimuth A—shown in FIG. 20—is 45° as in the configuration in FIGS. 7 and 8.

More generally, it will be understood that the orientation of the turret 8 with respect to the chassis 2 and the orientation of the platform 20 with respect to the arm 12—or even where applicable the orientation of the arm 12 with respect to the arm 10 if the end 13 has a vertical pivot connection—can be modified independently of each other by means of the control console 30.

To assist the operator at the control station 30 during commands for moving the chassis 2 on the ground and to limit the risk of confusion concerning the direction of movement thereof, the aerial work platform 1 is provided with a visual signalling system.

According to a first aspect, this visual signalling system comprises marking at the control handle 32 and visual signalling at the chassis 2 repeating the marking at the control handle 32 so that the operator can determine the direction of movement of the chassis 2 on the ground by comparing the two.

More particularly, marking in the form of two arrows—referenced $M_{AR}$ and $M_{AV}$—with different shapes and colours is affixed to the control console 30 alongside the control handle 32. The arrow $M_{AR}$ points towards the operator standing in front of the console 30 and therefore corresponds to the direction of action on the control handle 32 in order to trigger the movement of the chassis 2 in the backward direction $F_{AR}$. The arrow $M_{AV}$ points in the opposite direction and corresponds to the direction of action on the control handle 32 in order to trigger the movement of the chassis in the forward direction $F_{AV}$.

Moreover, arrows similar to those $M_{AV}$, $M_{AR}$ are arranged on the chassis 2—or on parts secured thereto—and point respectively in the forward $F_{AV}$ and backward $F_{AR}$ movement directions. The similarity between the arrows $M_{AV}$ and respectively $M_{AR}$ with the ones arranged on the chassis 2 enables the operator at the console 30 to check—by visual comparison—in which direction to act on the control handle 32 in order to move the chassis 2 on the ground in the desired direction. For this purpose, it is preferable to arrange the arrows so that at least one pointing in the direction $F_{AV}$ and at least one other pointing in the direction $F_{AR}$ are visible from the platform 30, whatever the relative position of the platform 20 with respect to the chassis 2.

In this example, there are firstly two arrows 63a and 64b pointing in the direction of forward movement $F_{AV}$ and which have a form and colour corresponding to the arrow $M_{AV}$, and secondly two arrows 63b and 64a pointing in the direction of backward movement $F_{AR}$ and which have a form and colour corresponding to the arrow $M_{AR}$. Each of these arrows is arranged on a mudguard above a respective wheel of the chassis 2. This location is advantageous since it is not covered by the turret 8, whatever its orientation, and it is easily visible from the platform 20 at least for those on the side of the platform 20.

More generally, if the turret 8 is off-centre with respect to the chassis 2 because of the size of its counterweight on the side opposite to the platform 20 (that is to say the side of the turret 8 towards which the orientation arrow $F_T$ points), the off-centre part of the turret 8 is liable to cover two of these arrows and therefore to conceal them. On the other hand, the other two arrows are not covered because the turret 8 has a smaller horizontal extension on the platform 8 side and therefore remain visible from the platform 20. These two arrows are all the more visible since the turret 8 does not make any obstacle thereto since they are on the side of the turret 8 corresponding to the platform 20.

It is advantageous to alternate the direction of movement pointed to by the arrows corresponding on each occasion to two successive wheels on the periphery of the chassis 2, as illustrated in the figures: cf. the pairs (63a, 63b), (63b, 64b), (64b, 64a) and (64a, 63a) each consisting of an arrow in the direction $F_{AV}$ and another in the direction $F_{AR}$. In this way, at least two arrows each pointing in another direction of movement of the chassis 2 on the ground are visible simultaneously from the platform 20, whatever the orientation of the turret 8.

According to a second aspect of the visual signalling system, the visual indicators consisting of the arrows 63a, 63b, 64a, 64b can be activated in order to attract the attention of the operator. The activation of the visual indicators consists of a visible change in state thereof compared with the inactive state thereof. They are preferentially implemented in the form of luminous indicators each comprising a part made from translucent plastic material with a colour and form corresponding to the arrows $M_{AV}$ and $M_{AR}$ according to circumstances. By way of example, the inactive state of an luminous indicator consists of being switched off whereas in the activated state it is switched on. It may be switched on continuously or more preferentially be blinking, which makes it possible to attract attention even more. Alternatively, the inactive state of an luminous indicator consists of being switched on continuously whereas in the activated state it blinks.

In the absence of any action on the control handle 32, the visual indicators on the chassis 2—in this case the arrows 63a, 63b, 64a, 64b—are inactive.

When the control handle 32 is actuated in the direction of the arrow $M_{AV}$ in order to trigger movement of the chassis 2 on the ground in the forward direction $F_{AV}$, the on-board electronics activates the arrows 63a and 64b, which point in the forward direction $F_{AV}$ while the arrows 63b and 64a pointing in the backward direction $F_{AR}$ remain inactive. Conversely, if the control handle 32 is actuated in the direction of the arrow $M_{AR}$ in order to trigger a movement of the chassis 2 on the ground in the backward direction $F_{AR}$, the on-board electronics activates the arrows 63b and 64a, which point in the backward direction $F_{AR}$ while the arrows 63a and 64b remain inactive. By virtue of the activation of these visual indications, the operator on board the platform 20 is informed of the direction of movement of the chassis 2 on the ground by simple observation of the chassis 2, without any intellectual effort of comparison of the individual indications on the chassis with the marking of the arrows $M_{AV}$ and $M_{AR}$ alongside the control handle 32.

Although it is advantageous for the visual signalling to be implemented by combining the first and second aspects that have just been described, it will be understood that they can be implemented independently of one another. For example, a visual signalling system may be provided on the chassis 2, activating visual indications in accordance with the second aspect—in this case implemented by the luminous indicators in the form of arrows 63a, 63b, 64a, 64b—without these being repeated by a similar marking alongside the control handle 32, in this case the arrows $M_{AV}$ and $M_{AR}$, which can for example be replaced by the words "FORWARD" and "BACKWARD". In this case, the luminous indicators in the form of arrows 63a, 63b, 64a, 64b may have identical forms and colours.

According to one variant, the activatable visual signalling does not consist of visual indicators pointing in a direction of movement of the chassis 2 on the ground, but of visual indicators—which may have any form, for example round—arranged on the front side $2_{AV}$ and on the rear side $2_{AR}$ of the chassis, and thereby making it possible to identify the corresponding side of the chassis 2 when they are activated.

When the control handle 32 is actuated in the direction of the arrow $M_{AV}$ in order to trigger a movement of the chassis 2 on the ground in the forward direction $F_{AV}$, the on-board electronics activates the visual indicator or indicators arranged on the front $2_{AV}$ of the chassis 2 while those on the rear side $2_{AR}$ remain inactive. Conversely, if the control handle 32 is actuated in the direction of the arrow $M_{AR}$ in order to trigger a movement of the chassis 2 on the ground in the backward direction $F_{AR}$, the on-board electronics activates the visual indicator or indicators arranged on the rear side $2_{AR}$ of the chassis 2 while those on the front remain inactive. In this way, the visual indicators that are activated attract the attention of the operator on the side of the chassis 2 corresponding to the movement direction selected.

These visual indicators may optionally have a different form and colour depending on whether they are arranged on the front side $2_{AV}$ or on the rear side $2_{AR}$ of the chassis. In this case, a marking repeating the two types of indicator can be affixed correspondingly alongside the control handle 32 in accordance with the first aspect described above.

It is preferable to implement this variant for aerial work platforms for which the visual indicators can be arranged so that at least one visual indicator on the rear side $2_{AR}$ and at least one on the front side $2_{AV}$ of the chassis is visible from the control console 20, whatever the position of the platform 20 with respect to the chassis 2.

According to a third aspect, the visual signalling system comprises a set of activatable visual indicators disposed on the top of the turret 8 and distributed over the periphery thereof. In this case, there are 18 luminous indicators distributed regularly over the periphery of the turret 8 on either side of the arm 10. They are referenced 70.$i$, with $i$ taking the integer values from 1 to 18 in the order of the succession thereof on the periphery of the turret 8. It will be understood that the total number of indicators 70.$i$ may be different and they may be disposed on a notional closed curve other than a circle as depicted.

In the absence of action on the control handle 32, all the visual indicators 70$i$ are inactive. When the control handle 32 is actuated in the direction of the arrow $M_{AV}$ in order to trigger a movement of the chassis 2 on the ground in the forward direction $F_{AV}$, the on-board electronics activates the visual indicator 70.$i$ of the turret 8 that is closest to the longitudinal mid-plane of the chassis 2 on the front side $2_{AV}$ of the chassis 2, leaving the others inactive. It is the indicator 70.2 in the case of FIGS. 7 and 8 and the indicator 70.5 in the case of FIGS. 11 and 12. However, because of the absence of an indicator 70$i$ at the point where the arm 10 is mounted on the turret 8, it is advantageous to simultaneously switch on the two indicators 70.1 and 70.18 on either side of the arm 10 in order to indicate the forward direction $F_{AV}$ when the turret 8 is in its initial orientation: cf. FIGS. 1, 2 and 19.

Conversely, if the control handle 32 is actuated in the direction of the arrow $M_{AR}$ in order to trigger a movement of the chassis 2 on the ground in the backward direction $F_{AR}$, the on-board electronics activates the visual indicator 70.$i$ of the turret 8 that is closest to the longitudinal mid-plane of the chassis 2 on the rear side $2_{AR}$ of the chassis 2, leaving the others inactive. It is the indicator 70.11 in the case of FIGS. 7 and 8 and the indicator 70.14 in the case of FIGS. 11 and 12. Similarly to the case of forward movement, because of the absence of an indicator 70.$i$ at the point where the arm 10 rests in the lowered position on the turret 8, it is advantageous to simultaneously switch on the two indicators 70.9 and 70.10 on either side of the arm 10 in order to indicate the backward direction $F_{AR}$ when the turret 8 is in its initial orientation: cf. FIGS. 1, 2 and 19.

In this way, the operator on board the platform 20 is informed directly of the direction of movement of the chassis 2 on the ground simply by observing the visual indicators 70$i$ on the turret 8, without any intellectual effort on his part.

For implementation of this third aspect, the aerial work platform 1 comprises at least one sensor for determining the angle of rotation of the turret 8 with respect to the chassis 2, the on-board electronics using the signal supplied by this sensor to determine the indicator or indicators 70$i$ to be activated. This sensor may be of any suitable type, for example a coding wheel.

This third aspect is based on the principle according to which the indicators 70$i$ of the turret 8 that are disposed on the side $2_{AV}$ or $2_{AR}$ of the chassis 2 corresponding to the direction of movement $F_{AV}$ or $F_{AR}$ selected with the control handle 32 are activated. It may be implemented according to variants. For example, in the case of actuation of the control handle 32 to trigger a movement of the chassis on the ground in the forward direction $F_{AV}$, the on-board electronics activates all the indicators 70$i$ of the turret 8 that are situated on the side towards the front $2_{AV}$ of the chassis 2 with respect to the transverse axis T of the chassis 2 passing through the rotation axis Z of the turret 8, and leaves those on the other side in the inactive state. Thus the on-board electronics activates the indicators 70.1 to 70.4 and 70.15 to 70.18 for the configuration in FIGS. 1 and 2. Conversely, in the case of actuation of the control handle 32 to trigger a movement of the chassis on the ground in the backward direction $F_{AR}$, the on-board electronics activates all the indicators 70$i$ of the turret 8 that are situated on the side towards the rear $2_{AR}$ of the chassis 2 with respect to the transverse axis T of the chassis 2, and leaves those on the front side in the inactive state. Thus the on-board electronics activates the indicators 70.6 to 70.13 for the configuration in FIGS. 1 and 2.

According to a variant to the third aspect, the visual signalling system comprises a display device in the form of a display 72 arranged on the turret 8. As illustrated by FIG. 22, this display 72 consists of a set of luminous indicators 72.1 to 72.$n$—for example light emitting diode (LED) bulbs—arranged on the intersections of the notional grid preferably having a circular or polygonal contour. The on-board electronics activates—which preferentially consists of switching on—a subset of indicators 72.*i* leaving the others in the inactive state—which preferably consists of switching them off—so as to show a luminous arrow pointing in the direction of movement of the chassis 2 on the ground $F_{AV}$ or $F_{AR}$ when the control handle 32 is actuated in the direction of the arrow $M_{AV}$ or $M_{AR}$ respectively. In the various figures, the display 72 is on each occasion shown revealing a luminous arrow pointing in the forward direction $F_{AV}$. The display 72 is preferentially arranged on the top of the turret 8, which confers on it good visibility from the platform 20. A second display 72 can also be arranged on the top of the turret 8 so that there is one on either side of the telescopic arm 10. Provision may also be made for arranging—preferably substantially vertically—one or more displays 72 on various sides of the turret 8 and/or of the chassis 2. These will then be visible for persons on the ground.

It will be understood that this third aspect of the visual signalling system is independent of the first and second aspects described previously. However, the second and third aspects may be combined in various ways. For example, the visual indicators linked to the chassis 2 may be limited to those dedicated to indicating the direction of forward movement $F_{AV}$ when a corresponding command is triggered with the control handle 32 while the visual indicators 70.*i* of the turret 8 may be dedicated solely to indicating the direction of backward movement $F_{AR}$ when a corresponding command is triggered with the control handle 32.

According to a fourth aspect, the visual signalling system activates, on the screen 40 of the console 30, a visual indication informing the operator of the direction of movement of the chassis 2 on the ground that was selected at the control handle 32.

FIGS. 6A, 10A, 14A, 18A and 21A illustrate the display on the screen 40 corresponding to the configurations of the aerial work platform 1 shown respectively in FIGS. 1 and 2; 7 and 8; 11 and 12; 15 and 16; and 19.

A graphical representation 2' of the chassis 2 seen from above is displayed on the screen 40.

Considered in the plane of the page of the figures, the vertical axis of the screen 40 taken in the direction from bottom to top—referenced $F_P$'—is considered conventionally to represent the orientation of the console 30 defined by the arrow FP. This is because, if the screen is disposed horizontally on the console 30, the direction of the arrow $F_P$' defining the orientation of the screen 40 and the direction of the arrow $F_P$ defining the orientation of the console 30 coincide in all circumstances, whatever the azimuth A of the chassis 2 with respect to the console 30. From the point of view of the operator in front of the console 30, it is also thus when the screen 40 is inclined on the console 30 as shown, or even mounted vertically on the console 30, since he is standing in front of the screen 40.

The graphical representation 2' of the chassis 2 on the screen 40 is displayed so that its longitudinal axis L'—which represents the longitudinal axis L of the chassis 2—has always—that is to say in real time—an orientation in agreement with that of the longitudinal axis L of the chassis 2. In addition, the graphical representation 2' of the chassis 2 is displayed on the screen 40 with a direction going from rear $2_{AR}$' to front $2_{AV}$'—denoted $F_{AV}$'40 —that is in agreement with the direction $F_{AV}$ defining the orientation of the chassis 2, at least when the graphical representation 2' of the chassis 2 makes it possible to distinguish the front side $2_{AV}$' from the rear side $2_{AR}$'.

In other words, the angle A' between the direction $F_{AV}$' with respect to the vertical direction $F_P$' corresponds to the azimuth A of the chassis 2 with respect to the console 30.

In other words again, if the screen 40 is arranged horizontally on the console 30, the direction $F_{AV}$' of the graphical representation 2' of the chassis 2 on the screen 40 and the direction $F_{AV}$ of the chassis 2 are parallel and point in the same direction. It will be understood that the display on the screen 40 remains identical even if the screen is arranged so as to be inclined on the console 30 as shown, or even mounted vertically on the console 30. In other words, if the screen 40 is notionally made horizontal so as to look at it from above by pivoting it in an imaginary fashion about a horizontal straight line included in the plane of the screen 40, the direction $F_{AV}$' of the graphical representation 2' of the chassis on the screen 40 and the direction $F_{AV}$ of the chassis 2 are parallel and point in the same direction.

Moreover, graphical representations $A_{AV}$ and $A_{AR}$ similar to the arrows $M_{AV}$ and $M_{AR}$ placed alongside the control handle 32—preferably from the point of view both of their form and of their colour—are displayed on the screen 40. The arrow $A_{AV}$ is disposed so as always to point in the direction $F_{AV}$', the arrow $A_{AR}$ pointing in the opposite direction. The arrows $A_{AV}$ and $A_{AR}$ displayed on the screen 40 therefore point in directions in agreement with the directions of movement $F_{AV}$ and $F_{AR}$ of the chassis 2 on the ground.

The arrows $A_{AV}$ and $A_{AR}$ are preferentially displayed permanently on the screen 40, even in the absence of any action on the control handle 32 to move the chassis 2 on the ground. Thus the similarity between the arrows $A_{AV}$ and $A_{AR}$ on the screen 40 to the arrows $M_{AV}$ and $M_{AR}$ enable the operator at the console 30 to check—by visual comparison—in which direction to actuate the control handle 32 in order to move the chassis 2 on the ground in the required direction. This check therefore takes place on a principle similar to the first aspect of the visual signalling system described above, but by observation of the display on the screen in place of the visual indicators 63a, 63b, 64a, 64b secured to the chassis 2. One advantage is that the display of the screen 40 always remains visible in the same way for the operator at the console 30, whatever the position of the platform 20.

When the control handle 32 is actuated in order to move the chassis 2 on the ground, a visual indication is activated on the display at the screen 40 in order to indicate the direction of movement $F_{AV}$ or $F_{AR}$ selected. The activation of a visual indication at the screen 40 consists of a display of a new graphical element and/or a change in visual state of a graphical element already displayed on the screen 40.

By analogy with the second aspect of the visual signalling system, it can be implemented as follows.

When the control handle 32 is activated in the direction of the arrow $M_{AV}$ in order to trigger a movement of the chassis 2 on the ground in the forward direction $F_{AV}$, the control station 30 activates the arrow $A_{AV}$ on the display at the screen 40 while the arrow $A_{AR}$ continues to be displayed in its inactive form. Conversely, if the control handle 32 is activated in the direction of the arrow $M_{AR}$ in order to trigger a movement of the chassis 2 on the ground in the backward direction $F_{AR}$, the control station 30 activates the arrow $A_{AR}$ at the screen 40 while the arrow $A_{AV}$ remains displayed in its inactive form. In this way, the operator on board the platform 20 is informed directly of the direction of movement of the chassis 2 on the ground by simple observation of the screen 40, without any intellectual effort of comparison with the arrows $M_{AV}$ and $M_{AR}$ affixed alongside the control handle 32.

Preferentially, the display of the arrows $A_{AV}$ and $A_{AR}$ in their inactive form consists of a display with a fixed form and colour, while the display thereof in the active form consists either of an accentuation of the colour of the arrow concerned and/or an enlargement thereof, or an animation alternating enlargement and shrinkage in order to give an impression of visual pulsations like a beating heart.

In a variant, the arrows $A_{AR}$ and $A_{AV}$ are not displayed permanently on the screen 40. When the control handle 32 is actuated in order to trigger a movement of the chassis 2 on the ground, the control station 30 then displays on the screen the arrow $A_{AR}$ or $A_{AV}$ that corresponds to the direction of movement selected at the handle 32.

According to another variant, the arrows $A_{AR}$ and $A_{AV}$ are replaced on the screen 40 by a visual indication of any form other than pointing to a direction and displayed on the side $2_{AV}'$ or $2_{AR}'$ of the graphical representation 2' of the chassis that corresponds to the direction of movement selected at the control handle 32.

For implementation of this fourth aspect, the aerial work platform 1 comprises one or more suitable sensors for determining the azimuth A. Preferably, there is provided, for each possibility of pivoting about a vertical axis in the kinematic chain between the console 30 and chassis 2, at least one sensor for determining the corresponding pivot angle. In this case, such a sensor is provided to determine the rotation angle of the turret 8 with respect to the chassis 2 and another for the pivot angle of the platform 20 with respect to the arm 12. These sensors may be of any suitable type, known per se. On the basis of the signals from these sensors, the on-board electronics calculates the azimuth A, which is then used for displaying the graphical representation 2' of the chassis 2 with the orientation at the corresponding angle A'.

It will be understood that the variation in the angle A' with which the graphical representation 2' is displayed on the screen 40—when the azimuth A varies—may be discrete instead of continuous, for example with a pitch of 5°. It is preferable for the pitch to be sufficiently small to display the azimuth A on the screen 40 realistically in order to usefully assist the operator during commands for movement of the chassis on the ground. From this point of view, the pitch is preferably less than or equal to 15°.

It is advantageous to display on the screen 40 a graphical representation 20', 30' of the platform 20 and/or of the console 30 in a low position of the screen 40 in conformity with the orientation $F_P'$ corresponding to the orientation $F_P$. This enables the operator to more easily understand that the screen 40 displays the relative orientation of the chassis 2 with respect to the console 30. Similarly, a circle 41 with marks representing the principal directions like a compass, surrounding the graphical representation of the chassis 2 and of the platform 20, reinforces his understanding of the display.

It will be understood that the arrows $F_P'$ and $F_{AV}'$ and the axis L' are shown in the figures for requirements of the explanation, but do not need to be actually displayed on the screen 40.

FIGS. 6C, 10C, 14C, 18C and 21C illustrate a display that is a variant with respect to FIGS. 6A, 10A, 14A, 18A and 21A, in which the graphical representations, in particular the graphical representation 2' of the chassis 2, are made in perspective, giving a 3D effect. In this example, the platform 20 is not shown.

FIGS. 6B, 10B, 14B, 18B and 21B illustrate another display that is a variant with respect to FIGS. 6A, 10A, 14A, 18A and 21A. In this variant, the display is more complete in that it also comprises a graphical representation 8' of the turret 8 and a graphical representation 10' of the arms 10 and 12. Apart from the azimuth A, the graphical representations 2', 8', 10', 20' and 30' also respect the relative arrangement in plan view of the corresponding elements 2, 8, 10, 12, 20 and 30.

Other variant displays on the screen 40 can be envisaged. According to one variant, it is a simplified version in which the chassis 2 is not shown graphically on the screen 40, but only its longitudinal axis L along which it moves, for example in the form of a simple segment of a straight line oriented along the axis L'. In this case also, the direction of movement of the chassis 2 on the ground may be indicated on the screen 40 in the various ways already described.

The visual signalling system according to the fourth aspect may also be implemented in a simplified fashion. By way of example, the screen 40 may be replaced on the console 30 by the display device 40' illustrated in FIG. 23. The display device 40' comprises a fixed graphical representation of a wind rose 2", for example in the form of a marking made on the plate on which the control members 31 and 32 are mounted. The display device 40' further comprises a respective luminous indicator 45.i at the end of each arm of the wind rose 2".

Considered in the plane of the page of FIG. 23, the upwardly oriented vertical arm $F_P'$ of the wind rose 2" is considered conventionally to represent the orientation of the console 30 defined by the arrow $F_P$, in a similar manner to the case of implementation on the basis of the screen 40 described above. The various arms of the wind rose 2" with reference to the vertical arm $F_P'$ symbolise the various orientations that the chassis 2 can adopt with respect to the console 30.

When the control handle 32 is actuated in the direction $M_{AV}$ or $M_{AR}$, the display device 40' activates the luminous indicator 45.i at the end of the arm of the wind rose 2" suitable for indicating the corresponding direction of movement of the chassis 2 on the ground, while the other luminous indicators 45.i are left inactive. In other words, with regard to the actuation of the control handle 32 in the direction $M_{AV}$, the display device 40' activates the luminous indicator 45.i at the end of the arm of the wind rose forming an angle from the vertical arm $F_P'$ that corresponds substantially to the azimuth A. For the situation in FIGS. 7 to 9, it is the indicator 45.15: cf. the angle A' in FIG. 23 corresponding to the azimuth A in this case. If the control handle 32 is actuated in the direction $M_{AR}$, it is the indicator 45.7 of the opposite arm that is activated.

According to an even simpler variant, the wind rose 2" is omitted, the graduated dial formed intrinsically by the luminous indicators 45.i being sufficient in itself to identify the direction of movement of the chassis in its azimuthal direction.

Moreover, it will be understood that the display device 40' may also be used in the context of the display system according to the third aspect described above. In other words, such a display device 40' may be arranged on the turret 8—similarly to the display 72 described above—in order to indicate the direction of movement of the chassis 2 on the ground. In this case, it is preferable to enlarge the display device 40' in order to improve the visibility thereof from the platform 20.

The visual signalling system according to the fourth aspect—which is based on a display device arranged on the control console—is particularly advantageous since the operator knows the direction of movement of the chassis 2 on the ground, even if the environment (fog, darkness, rain, overhanging of an obstacle, etc.) does not enable him to see distinctly the chassis 2, the turret 8 and the visual signallings arranged thereon. Provision may also be made on the chassis 2 for a camera on the front side and another on the rear side $2_{AR}$ filming in the directions $F_{AV}$ and $F_{AR}$ respectively. The images from the cameras are displayed on the screen 40, in addition to the previously described visual signalling, when there is a command for movement of the chassis 2 on the ground from the console 2, in order best to assist the operator.

According to a particularly advantageous embodiment, the visual signalling system activates the visual signalling indicating the direction of movement $F_{AV}$ or $F_{AR}$ of the chassis 2—or according to the circumstances the visual signalling identifying the corresponding side $2_{AV}$ or $2_{AR}$ of the chassis 2—which corresponds to the direction $M_{AV}$ or $M_{AR}$ in which the control handle 32 is actuated, even in the absence of simultaneous actuation of the validation member 50. In this case, the actuation of the control handle 32 does not cause movement of the chassis 2 on the ground, but the operator is nevertheless informed by the visual signalling system of the direction of movement of the chassis 2 on the ground corresponding to the direction of actuation of the control handle 32. The operator can thus check the direction of movement of the chassis 2 on the ground corresponding to a direction of actuation of the control handle 32, prior to the actual movement of the chassis 2 on the ground. This embodiment can be implemented independently of the type of activatable visual signalling that is used by the visual signalling system, and in particular independently of whether it is designed according to the second, third or fourth aspect, or a combination thereof.

Whatever the previously described aspect or aspects according to which it is implemented, the visual signalling system may also be designed to provide additional information to the operator.

On sites, the aerial work platforms may be controlled by a plurality of users and at different times. When an operator takes over the station, there is a risk of confusion of the direction of movement if the previous operator has not repositioned the work platform in the initial orientation. This is particularly the case if the turret is at 180° with respect to the initial orientation. In order to limit this risk, the visual signalling system may be designed to activate, when the aerial work platform is powered up, for a predetermined period—for example 3 seconds—all its visual indicators: arrows on the chassis 63a, 63b, 64a, 64b, the indicators 70.1 and arrows $A_{AV}$, $A_{AR}$ according to circumstances. This makes it possible to check the functioning of the visual indicators. Furthermore, the activation may be different depending on whether—on powering-up—the turret 8 is oriented with respect to the chassis 2 towards its idle position—that is to say when the angle between $F_T$ and $F_A$ lies in the range from −90° to +90° taken in the trigonometric direction—or towards the other side—that is to say when the angle between $F_T$ and $F_{AV}$ lies in the range from +90° to 270° taken in the trigonometric direction, which makes it possible to draw the attention of the operator to any reversal of the turret. For example, the illumination of the visual indictors may be continuous in the first case and blinking in the second case.

When the aerial work platform is powered down, the visual signalling system can be designed to activate for a predetermined period—for example 3 seconds—all its visual indicators or at least some of them, preferably blinking, in the case where the turret 8 is oriented towards the side opposite to its idle position, that is to say when the angle between $F_T$ and $F_{AV}$ is in the aforementioned range from +90° to 270°. On the other hand, it does not activate any visual indicator if the turret 8 is oriented on the side of its idle position, that is to say when the angle between $F_T$ and $F_{AV}$ is in the aforementioned range from −90° to +90°. This makes it possible to draw the attention of the operator to any reversal of the turret 8 and therefore to decide on placing it in a non-reversed position.

For the same purposes, in service, the visual signalling system may be designed to activate its visual indicators, preferably by making them blink, when the turret 8 is oriented towards the side opposite to its idle position in the case where the validation member 50 is actuated, but without any simultaneous actuation of a command of the control station 30 that is dependent on the validation member 50.

Similarly, in the context of the fourth aspect, the visual signalling system may be designed so that the change affecting the arrow $A_{AR}$ on the screen 40 when it is activated is different from the one affecting the arrow $A_{AV}$ when it is activated. It is advantageous for the change affecting the arrow $A_{AR}$ to attract more attention than the one affecting the arrow $A_{AV}$. For example, activation of the arrow $A_{AV}$ may consist of an accentuation of colour and/or an enlargement, while activation of the arrow $A_{AR}$ further comprises the blinking thereof.

Naturally the present invention is not limited to the examples and embodiment described and depicted but is capable of numerous variants accessible to a person skilled in the art.

Thus the manually activated control member of the console 30 for moving the chassis 2 on the ground may be different from the control handle 32: it may be a case, for example, of two push buttons each corresponding to a respective direction of movement.

Moreover, the prior check on the direction of movement of the chassis 2 on the ground with respect to the direction of actuation of the control handle 32 may be allocated to a dedicated manually actuated member, preferably arranged on the control console 30, and inhibiting the movement on the ground of the chassis 2 when it is actuated, replacing the role fulfilled by the validation member 50 in this regard.

In addition, the invention applies to any type of self-propelled aerial work platform the movement of which on the ground is able to be controlled by an operator on board its work platform while the azimuth A of the chassis with respect to the control console mounted permanently on the work platform is liable to change, irrespective of the number of vertical pivot connections existing in the kinematic chain between the chassis and the control console. In particular, the invention also applies to articulating boom lift and to vertical-mast aerial work platforms.

Finally, the invention also applies to self-propelled aerial work platforms for which the control console is not arranged fixedly on the work platform but is removable by the operator during use of the lifting work platform.

FIGS. 24 to 26 illustrate this case for a scissor aerial work platform 101. It comprises a chassis 102 mounted on four wheels (only two of them 103a, 104a being visible), at least two of which are steered. The chassis 102 is motorised for movement thereof on the ground in the forward direction $F_{AV}$ (corresponding to the front side of the chassis $102_{AV}$ and the backward direction $F_{AR}$ corresponding to the rear side of the chassis $102_{AR}$. The lifting system 110 mounted on the chassis 102 comprises a mechanism of scissor-type articulated beams stacked one on the other. One or more hydraulic jacks make it possible to raise and lower the work platform 102 vertically. The work platform 102 may be extensible as shown. For this purpose, it comprises a first part 121a supported by the scissor lifting structure 110 and a second part 121b mounted so as to be able to slide with respect to the first part 121a. Because of this, the guardrail 122 is also produced in two parts 122a, 122b sliding one with respect to the other.

A control console 130 is arranged on the platform 120. The control console 130 conventionally makes it possible to lower and raise the platform 120, to move the chassis 102 on the ground in the forward direction $F_{AV}$ and in the backward direction $F_{AR}$ and to modify the orientation of the steered wheels.

The control console 130 is designed to be movable by the operator so as to be able to attach it removably at various points on the guardrail 122. In FIG. 24, the control console 130 is attached in its preferential position of attachment to the guardrail 122: this is the case also in FIG. 25 under its reference 130. The control console 130 can be locked on the guardrail 122 at this location, the operator being able to effect the locking or unlocking thereof. The locked position prevents accidental movement of the console 130 on the guardrail 122, or even a detachment, in particular during transport of the aerial work platform by lorry.

FIG. 25 shows three examples of other places on the guardrail 122 where the control console is attached: cf. the references 130.1, 130.2 and 130.3. For reasons of simplicity, it is preferable not to provide for the possibility of locking of the control console 130 on the guardrail 122 outside the preferential attachment position.

The console 130 may also be designed so that the operator can hold it in only one hand and manipulate its control members with the other, which makes it possible in particular to control the aerial work platform 101 from the ground instead of from the platform 120.

Naturally, the control console 130 is in communication with the on-board electronics installed on the chassis of the aerial work platform by a suitable connection, whether it be a wire or wireless connection.

As can be seen from the various examples of the position of the control console 130 in FIG. 25, the orientation of the control console 130 with respect to the chassis 120 can be varied during use of the aerial work platform because it is removable and movable by the operator, although the orientation of the platform 120 with respect to the chassis 102 is constant. In other words, the azimuth of the chassis 102 with respect to the control console 130 may vary during use of the aerial work platform.

In order to prevent the operator confusing the forward $F_{AV}$ and backward $F_{AR}$ directions of movement of the chassis 102 on the ground, the aerial work platform 101 is equipped with a visual signalling system comprising one or more luminous indicators that can be activated to identify the direction of movement selected at the control console 130. It is preferable for it to comprise at least two of them, one to point in the forward direction $F_{AV}$ and the other in the backward direction $F_{AR}$. However, it is more advantageous still for there to be four of them, which is the case in the example illustrated: cf. the luminous indicators 163a, 163b, 164a, 164b.

It is advantageous for these luminous indicators to be arranged on the platform 120 itself. This is because, for a scissor-type aerial work platform, they are more easily visible to the operator on board the platform than if they are placed on the chassis, and implementation is simple since the orientation of the platform 120 is fixed with respect to the chassis 102.

As illustrated, the luminous indicators 163a, 163b, 164a, 164b are advantageously in the form of an arrow. Two of them are arranged towards the front of the platform 120 and each point in another of the forward $F_{AV}$ and backward $F_{AR}$ directions. Two others are arranged towards the rear of the platform 120 and also each point in another of the forward $F_{AV}$ and backward $F_{AR}$ directions. It is advantageous that the luminous indicators pointing towards the front and those pointing towards the rear have different forms and/or colours that are repeated in the form of marking on the control console at the member or members controlling the movement of the chassis 103 on the ground, similarly to the second aspect of the visual signalling system described above for an arm-type aerial work platform.

In the case of actuation of the member 132 controlling the movement of the chassis on the ground, the visual signalling system activates those of the indicators 163a, 163b, 164a, 164b that point in the direction of movement selected while the others are maintained inactive.

It is advantageous to integrate these luminous indicators in or on toeboards framing the bottom of the guardrail 122 of the work platform 120 as illustrated, for convenience of wiring and limitation of the risk of impacts during handling of equipment on board the platform 120.

Moreover, it is advantageous for these luminous indicators to pass through the toeboard as illustrated—or to be duplicated inside and outside the toeboard—in order to be visible both from the inside and outside of the platform 120.

Naturally, a manually actuated member inhibiting the movement of the chassis 102 on the ground when it is actuated—or on the contrary if it is not actuated in the case of a validation member of the "dead man's handle" type— may also be provided on the control console 130 for the purpose of prior checking of the direction of movement selected on the control console 130 in the light of those of the luminous indicators 163a, 163b, 164a, 164b that are activated.

Moreover, it will be understood that the visual signalling system may be the subject of numerous variants. For example, the luminous indicators may have any form without any particular orientation in order to identify through activation thereof the side of the aerial work platform corresponding to the direction of movement selected. According to another example, the indicators 163a, 163b, 164a, 164b are replaced by one or more displays in accordance with the one described with reference to FIG. 22 in order each to display a luminous arrow pointing in the direction of movement selected.

Finally, the control console 130 may be equipped with a display device for visually identifying the direction of movement selected similarly to the fourth aspect described above for an arm-type aerial work platform. In this case, the display system will comprise one or more suitable sensors for determining the azimuth of the chassis 102 with respect to the control console 130. By way of example, recourse may be had to two electronic compasses known per se and available commercially: one is fixed to the chassis 102 in order to provide its azimuth with respect to the cardinal points and the other is integrated in the control console 130 to supply the azimuth of the latter with respect to the cardinal points. The visual signalling system then determines the azimuth of the chassis 102 with respect to the control console 130 by calculating the difference therebetween.

More generally, it will be understood that the different variants of the visual signalling system disclosed above for an arm-type aerial work platform apply mutatis mutandis to the case of the scissor-type aerial work platform, except with regard to the turret, which is non-existent with the latter.

The invention claimed is:

1. A self-propelled aerial work platform comprising:
a chassis having a longitudinal axis along which the chassis is able to move on the ground in a forward direction and in a backward direction opposite to the forward direction;
a work platform;
a lifting structure mounted on the chassis and supporting the work platform;
a control console for:
controlling the lifting structure in order to move the platform to a working position at a height; and
selectively moving the chassis on the ground in the forward direction and the backward direction; and
a visual signalling system for indicating the direction of movement of the chassis on the ground selected at the control station from the forward and backward directions,
the visual signalling system comprising a first and a second visual indicator secured to the chassis and located on a front side of the chassis and a third and a fourth visual indicator secured to the chassis and located on a rear side of the chassis,
wherein:
the visual signalling system is configured to activate the first and third visual indicators in order each to procure the visual indication of the forward direction in the form of an oriented form pointing in the forward direction; and
the visual signalling system is configured to activate the second and fourth visual indicators in order each to procure the visual indication of the backward direction in the form of an oriented form pointing in the backward direction.

2. The aerial work platform according to claim 1, wherein:
the first and fourth visual indicators are further located towards a same lateral side of the chassis; and
the second and third visual indicators are further located towards the other lateral side of the chassis.

3. The aerial work platform according to claim 2, wherein:
the chassis is mounted on two front wheels and two rear wheels by means of which the chassis moves on the ground; and
each of said visual indicators is arranged above a respective one of the wheels.

4. The aerial work platform according to claim 3, wherein:
the lifting structure comprises:
a turret mounted so as to pivot about a vertical axis on the chassis; and
a mechanism for lifting the work platform which is mounted on the turret, the work platform being offset to one side with respect to the turret; and
said visual indicators are located so that at least two of them following each other on the periphery of the chassis on the side corresponding to the platform are free from any superimposition by the turret, whatever the orientation of the turret with respect to the chassis.

5. The aerial work platform according to claim 1, wherein:
the lifting structure comprises:
a turret mounted so as to pivot about a vertical axis on the chassis; and
a mechanism for lifting the work platform which is mounted on the turret; and
the visual signalling system further comprises:
at least one sensor for determining the orientation of the turret with respect to the chassis; and
at least one visual indicator arranged on the turret that the visual signalling system activates in order to procure the visual indication of at least one of the forward and backward directions.

6. The aerial work platform according to claim 5, wherein the visual signalling system comprises a plurality of visual indicators arranged on the turret and distributed angularly around the vertical axis of the turret, the signalling system procuring the visual indication of at least one of the forward and backward directions by activating at least one of the visual indicators located on a corresponding longitudinal side of the chassis.

7. The aerial work platform according to claim 1, wherein:
the orientation of the work platform is fixed with respect to the chassis; and
the visual signalling system further comprises at least one visual indicator secured to the work platform that the visual signalling system activates to procure the visual indication of at least one of the forward and backward directions.

8. The aerial work platform according to claim 7, wherein:
the visual signalling system comprises at least two luminous indicators secured to the work platform, one pointing in the forward direction and the other pointing in the backward direction; and
the visual signalling system is designed to activate whichever of the indicators points in the direction of movement selected at the control console from the forward and backward directions while the other is maintained inactive.

9. The aerial work platform according to claim 1, wherein the lifting structure comprises:
a turret mounted so as to pivot about a vertical axis on the chassis; and
a mechanism for lifting the work platform which is mounted on the turret.

10. The aerial work platform according to claim 1, wherein the azimuth of the chassis with respect to the control console is able to vary during use of the aerial work platform.

11. The aerial work platform according to claim 10, wherein:
the control console comprises at least one member for controlling movement on the ground actuatable by the operator in order to selectively move the chassis on the ground in the forward direction and in the backward direction; and
the work platform or the control console comprises a validation member that can be actuated by the operator, wherein the aerial work platform is configured to inhibit movement of the chassis on the ground according to an actuation or absence of actuation of the validation member, the visual signalling system indicating the direction of movement selected at the at least one control member by activation of the at least one visual indication despite the inhibition of movement of the chassis on the ground.

12. A self-propelled aerial work platform comprising:
a chassis having a longitudinal axis along which the chassis is able to move on the ground in a forward direction and in a backward direction opposite to the forward direction;
a work platform having an orientation which is fixed with respect to the chassis;
a lifting structure mounted on the chassis and supporting the work platform;

a control console for:
controlling the lifting structure in order to move the platform to a working position at a height; and
selectively moving the chassis on the ground in the forward direction and the backward direction; and
a visual signalling system for indicating the direction of movement of the chassis on the ground selected at the control station from the forward and backward directions;
wherein:
the visual signalling system comprises four luminous indicators—secured to the work platform, two of them being arranged towards a front of the platform and each pointing in another of the forward and backward directions and the other two being arranged towards a rear of the platform and each pointing in another of the forward and backward directions; and
the visual signalling system is designed to activate those of the four indicators that point in the direction of movement selected at the control console from the forward and backward directions while the others are maintained inactive.

13. The aerial work platform according to claim 12, wherein one or more of said luminous indicators or all of said luminous indicators are arranged on or integrated in toeboards framing a bottom of a guardrail of the work platform.

14. The aerial work platform according to claim 13, wherein one or more of said luminous indicators or all of said luminous indicators are arranged passing through the toeboards or duplicated inside and outside the corresponding toeboard in order to be visible both from the inside and the outside of the work platform.

15. The aerial work platform according to claim 12, wherein the control console is freely movable by the operator during use of the aerial work platform.

16. The aerial work platform according to claim 15, wherein the control console is designed to be attached at various places on a guardrail of the work platform.

17. The aerial work platform according to claim 12, wherein the azimuth of the chassis with respect to the control console is able to vary during use of the aerial work platform.

18. The aerial work platform according to claim 17, wherein:
the control console comprises at least one member for controlling movement on the ground actuatable by the operator in order to selectively move the chassis on the ground in the forward direction and in the backward direction; and
the work platform or the control console comprises a validation member that can be actuated by the operator; wherein the aerial work platform is configured to inhibit movement of the chassis on the ground according to an actuation or absence of actuation of the validation member, the visual signalling system indicating the direction of movement selected at the at least one control member by activation of the at least one visual indication despite the inhibition of movement of the chassis on the ground.

* * * * *